(12) United States Patent
Aoshima et al.

(10) Patent No.: US 7,313,650 B2
(45) Date of Patent: Dec. 25, 2007

(54) SERVER AND METHOD FOR MANAGING VOLUME STORING DIGITAL ARCHIVE

(75) Inventors: Tatsundo Aoshima, Yokohama (JP); Shoichi Fukumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 553 days.

(21) Appl. No.: 10/980,291

(22) Filed: Nov. 4, 2004

(65) Prior Publication Data
US 2006/0047924 A1 Mar. 2, 2006

(30) Foreign Application Priority Data
Aug. 30, 2004 (JP) .............................. 2004-250282

(51) Int. Cl.
*G06F 13/10* (2006.01)
(52) U.S. Cl. ..................................... 711/114
(58) Field of Classification Search ................ 711/113, 711/114, 135
See application file for complete search history.

(56) References Cited

U.S. PATENT DOCUMENTS 5,325,497 A 6/1994 Jaffe et al.
6,260,120 B1 7/2001 Blumenau et al.
6,883,065 B1 4/2005 Pittelkow et al.
6,886,047 B2 4/2005 Leong et al.
2001/0029502 A1 10/2001 Oeda
2003/0229698 A1 12/2003 Furuhashi et al.
2005/0204104 A1 9/2005 Aoshima et al.

FOREIGN PATENT DOCUMENTS

JP 2000-57672 2/2000
JP 2000-057672 2/2000

*Primary Examiner*—Kevin L. Ellis
(74) *Attorney, Agent, or Firm*—Antonelli, Terry, Stout & Kraus, LLP.

(57) ABSTRACT

The archive host selects the desired logical VOL-ID from among a plurality of logical VOL-ID corresponding with a plurality of physical VOL that exist in the storage control system pool that consists of a plurality of storage control systems, and sends the selected logical VOL-ID to the server. The server references the logical-physical VOL management table to acquire the physical VOL-ID of the physical VOL managed in the storage control system that corresponds with the received logical VOL-ID, specifies the storage control system that comprises the physical VOL corresponding with this ID, and then reports information relating to the specified storage control system and acquired physical VOL-ID to the archive host.

13 Claims, 19 Drawing Sheets

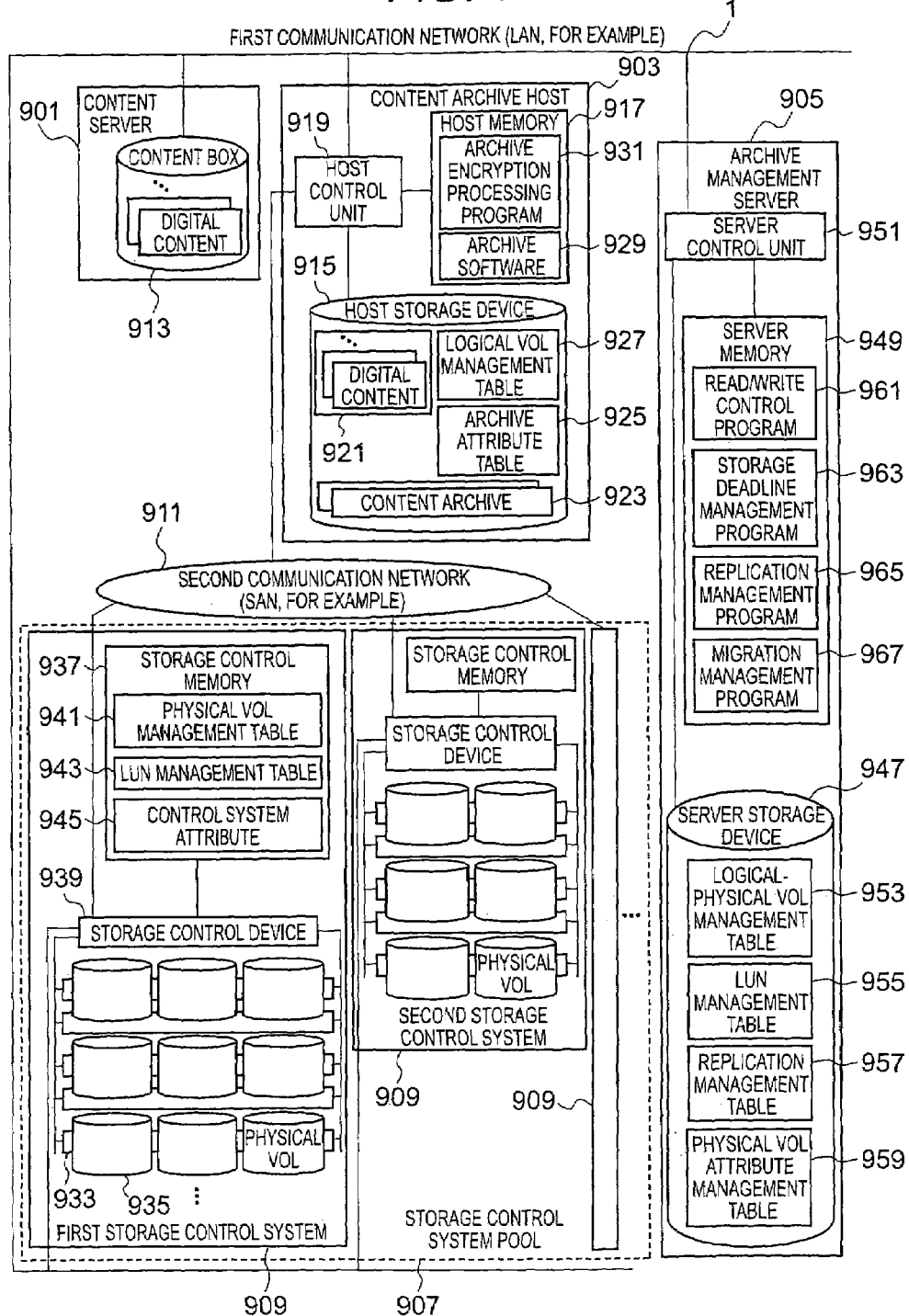

FIG. 2(A)

LOGICAL VOL MANAGEMENT TABLE

| LOGICAL VOL-ID | ARCHIVE NAME |
|---|---|
| 1 | |
| 2 | AAAAA |
| 3 | |
| ⋮ | ⋮ |

ARCHIVE ATTRIBUTE TABLE

| ARCHIVE NAME | ARCHIVE ATTRIBUTE (STORAGE DEADLINE, FOR EXAMPLE) |
|---|---|
| AAAAA | Ddddd |
| BBBBBB | Tttttt |
| CCCC | Gggggg |
| ⋮ | ⋮ |

PHYSICAL VOL MANAGEMENT TABLE ~941

| PHYSICAL VOL-ID | STATUS | STORAGE CAPACITY |
|---|---|---|
| 0001 | RO | 100GB |
| 0002 | RW | 100GB |
| 0003 | Free | 100GB |
| ... | ... | ... |

FIG. 3(B)

LUN MANAGEMENT TABLE ~943

| PORT ID | TARGET ID | LUN | STORAGE CAPACITY | PHYSICAL VOL-ID GROUP |
|---|---|---|---|---|
| 1001 | 1001 | 1 | 1000GB | ... |
| 1001 | 1001 | 2 | 1000GB | ... |
| ... | ... | ... | ... | ... |

FIG. 3(C)

CONTROL SYSTEM ATTRIBUTE DATA

| ENCLOSURE ID | ~945 |
|---|---|
| 1001 | |

FIG. 4(A)

LOGICAL-PHYSICAL VOL MANAGEMENT TABLE 953

| LOGICAL VOL-ID | ENCLOSURE ID | PHYSICAL VOL-ID | STATUS | STORAGE DEADLINE |
|---|---|---|---|---|
| 1 | 1001 | 0001 | RO | 3650 |
| 2 | 1001 | 0002 | RW | - |
| 3 | 1002 | 0001 | Free | - |
| ... | ... | ... | ... | ... |

| FULL STORAGE CAPACITY/ UNUSED CAPACITY | EXPIRY ACTION | ACCESS FREQUENCY | IMPORTANCE |
|---|---|---|---|
| 100GB/20GB | DATA ERASURE | 100 | HIGH |
| 100GB/40GB | ALERT ISSUE | 200 | MEDIUM |
| 100GB/50GB | - | - | - |
| ... | ... | ... | ... |

FIG. 4(B)

LUN MANAGEMENT TABLE 957

| ENCLOSURE ID | PORT ID | TARGET ID | LUN | PHYSICAL VOL-ID GROUP |
|---|---|---|---|---|
| 1001 | 1001 | 1001 | 1 | ... |
| 1001 | 1001 | 1001 | 2 | ... |
| 1002 | 1002 | 1002 | 1 | ... |
| ... | ... | ... | ... | ... |

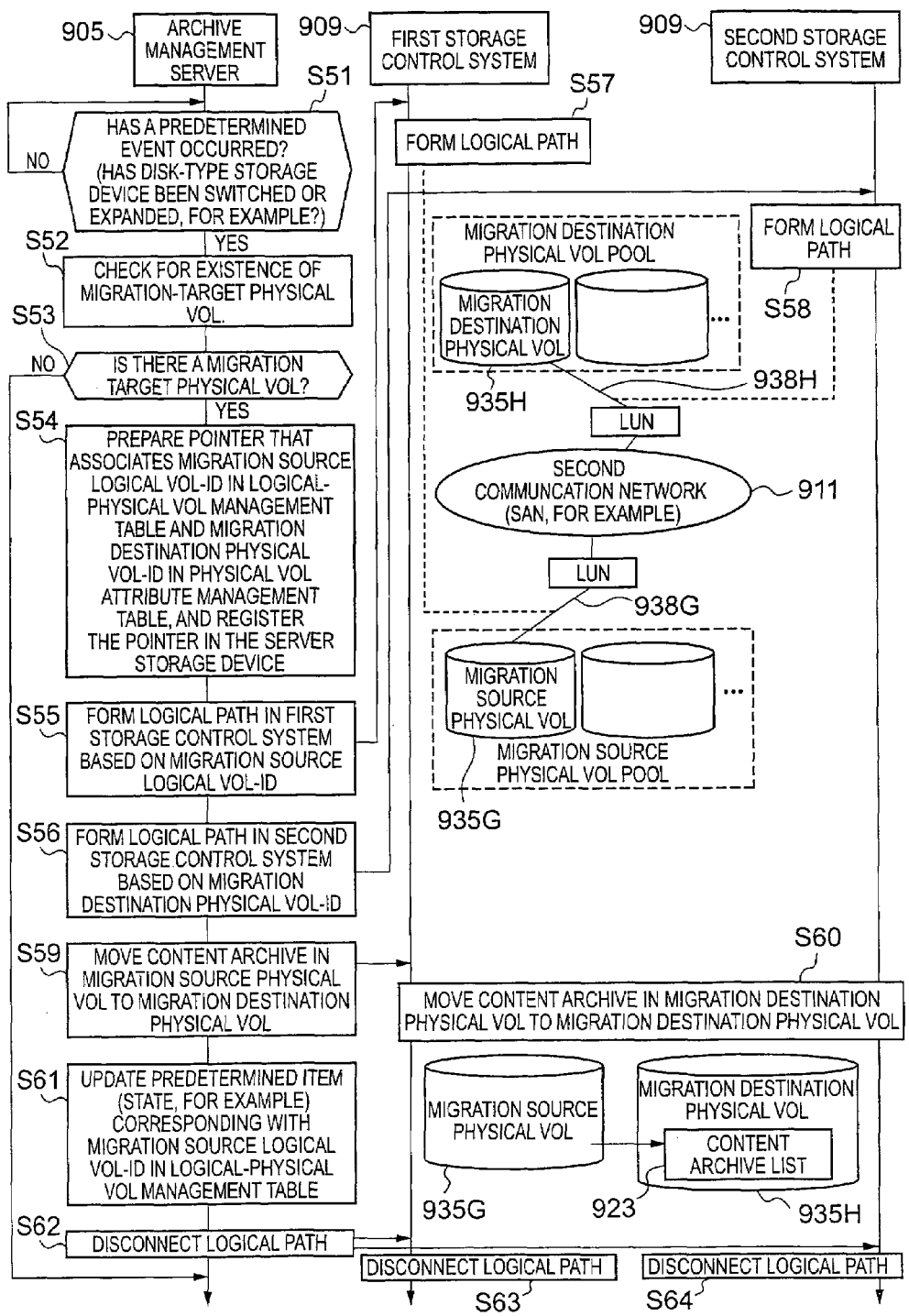

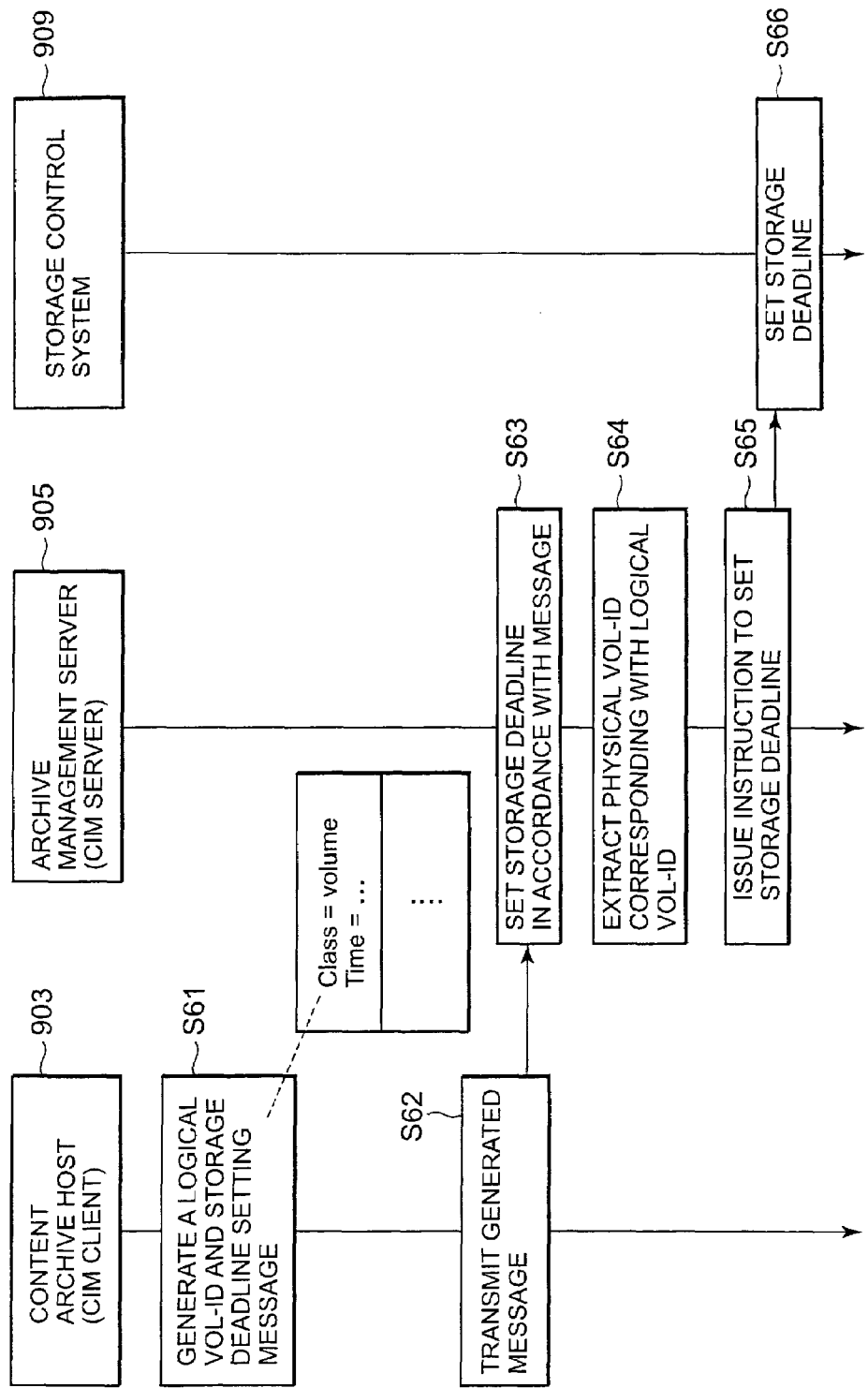

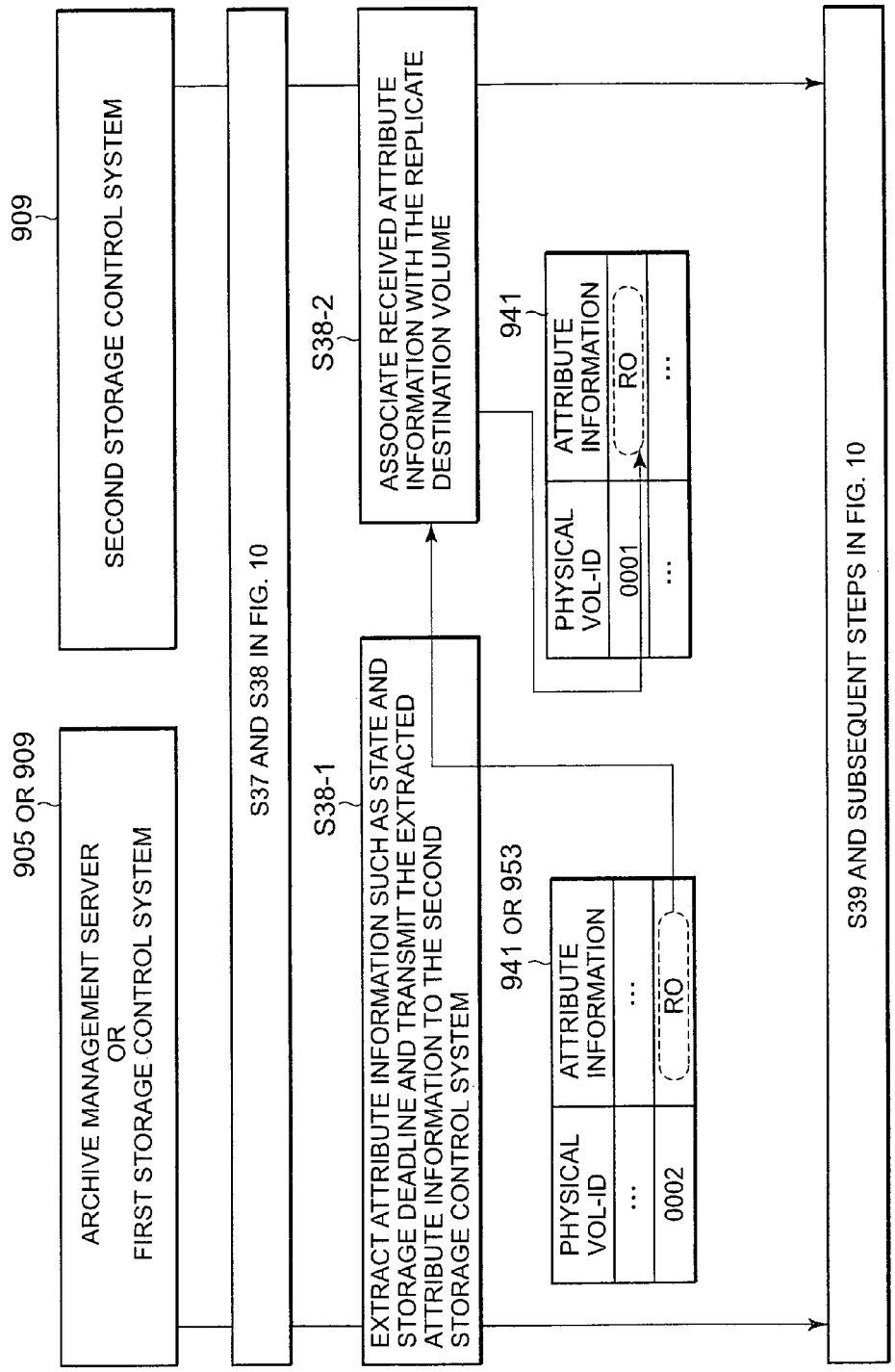

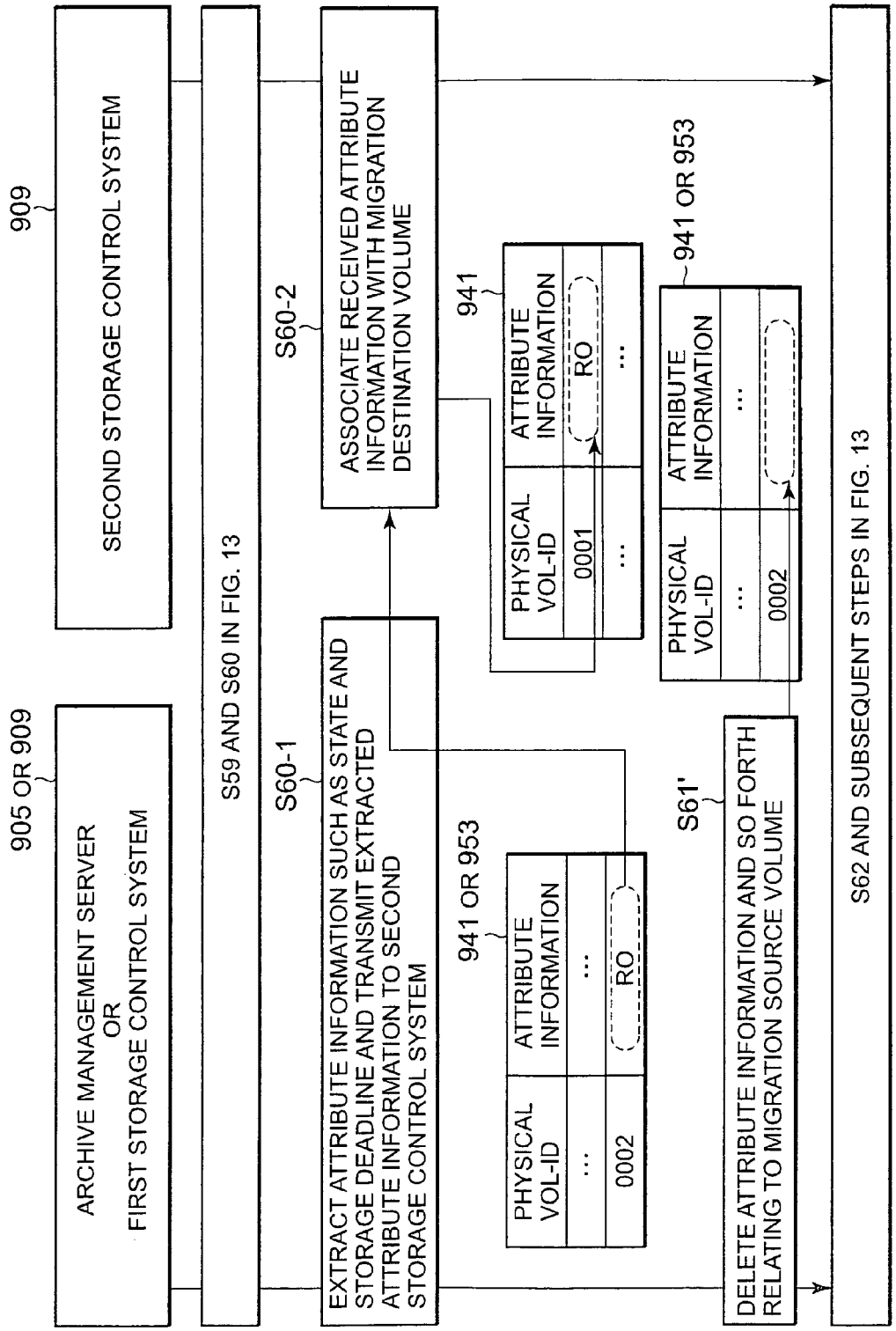

SERVER AND METHOD FOR MANAGING VOLUME STORING DIGITAL ARCHIVE

CROSS-REFERENCE TO RELATED APPLICATIONS

This application relates to and claims priority from Japanese Patent Application No. 2004-073030 filed on Mar. 15, 2004, the entire disclosure of which is incorporated herein by reference.

BACKGROUND OF THE INVENTION

The present invention relates to a technology for storing a digital archive, such as a server, method and storage system for managing a volume constituting a data storage region provided in a disk-type storage device, for example.

There is a need to manage data such as electronic mail as a digital archive. As a device fulfilling this need, a jukebox device in which a plurality of recording/playback devices is installed, for example, is known.

More specifically, for example, in Japanese Patent Application Laid Open No. 2000-57672, when a write address that exceeds the recording capacity of one recording medium is designated by a host device 8a, writing following conversion of the physical address of a second recording medium to a logical address is accepted. The recording medium is an optical disk or similar.

As the recording medium disclosed in Japanese Patent Application Laid Open No. 2000-57672, a CD (Compact Disk), DVD (Digital Versatile Disk), or similar, may be considered. Hence, in a case where a digital archive is written to the recording medium in the jukebox device as in Japanese Patent Application Laid Open No. 2000-57672 and the digital archive is managed, the emergence of at least one of the following problems (1) to (3), for example, may be considered.

(1) a long time is required for writing;

(2) replacement of the recording medium by means of a robot mechanism takes time;

(3) in order to prepare for damage to the recording medium, the recording medium must be transported to a physically separate location and archived there.

As a method for solving such problems, a method that writes a digital archive to a disk-type storage device in a storage control system such as a RAID system rather than a recording medium in a jukebox device may be considered. It is thought that at least one of the above problems (1) to (3) can be resolved if this method is adopted. However, when the write destination of the digital archive is simply a disk-type storage device in a storage control system, other problems can occur, such as at least one problem among (a) to (c) below, for example:

(a) the write source device of the digital archive (host device, for example) is burdened with the task of having to manage the constitution of the disk-type storage device in the storage control system. This is considered a further burden when the constitution within the storage control system becomes complicated and the number of write-destination storage control systems increases;

(b) It must be possible to recover data even when the disk-type storage device is damaged; and (c) Because there are several types of disk-type storage device, a trade-off between cost and performance exists, and hence the judgment of what kind of disk-type storage device the digital archive may be written to is difficult.

SUMMARY OF THE INVENTION

Accordingly, an object of the present invention is to increase the convenience of digital archive storage. More specifically, for example, an object of the present invention is to resolve at least one of the above-mentioned problems (a) to (c) that can arise when writing a digital archive to a disk-type storage device in a storage control system.

Further objects of the present invention will become apparent from the following description.

The server according to a first aspect of the present invention is a server connected to an archive host that outputs a digital archive and to a plurality of storage control systems that comprise disk-type storage devices in which the digital archive is stored. A plurality of physical volumes constituting storage regions for storing a digital archive are provided in two or more of the disk-type storage devices that the plurality of storage control systems comprises. One or more physical IDs, each of which is allocated to one or more physical volumes that the storage control systems comprise, among the plurality of physical volumes, are managed by the individual storage control systems. A plurality of logical IDs, each of which is allocated to each of the plurality of physical volumes, is managed by the archive host. The server comprises a volume management storage region that stores the logical ID, the physical ID, and a control system ID of a storage control system that comprises the physical volume, for each of the plurality of physical volumes; extraction means, which, when the designation of a logical ID selected from among the plurality of logical IDs is received from the archive host, extract the physical ID and control system ID that correspond with the received logical ID from the volume management storage region; and access path reporting means for reporting, to the archive host, access path information for accessing the physical volume with the physical ID, this access path information being based on the physical ID and control system ID thus extracted.

Here, 'reporting access path information to the archive host' means that access path information is reported to the archive host in accordance with an output from the server, and, thus, this also includes the reporting of access path information to the archive host by a storage control system when the server instructs the storage control system to do so, for example.

According to a first embodiment of the server, the storage control system is provided with a host connection section (LUN described subsequently, for example) connected to the archive host, and a volume pool comprising one or more physical volumes that are not logically connected to the host connection section. The server further comprises connect instruction means for outputting a connect instruction for a logical connection of the physical volume corresponding with the determined physical ID to the host connection section, to a storage control system specified by the acquired control system ID; and disconnect instruction means, which, after the archive host has accessed the physical volume corresponding with the extracted physical ID, output a disconnect instruction to break the connection between the physical volume corresponding with the acquired physical ID and the host connection section, to a storage control system that is specified by the extracted control system ID.

According to a second embodiment of the server, the volume management region further stores an archive storage deadline and a volume state for each of the plurality of physical volumes. The server further comprises storage deadline setting means and write inhibit state setting means.

The storage deadline setting means record, after the digital archive is stored in the physical volume corresponding with the extracted physical ID, a storage deadline that corresponds with the physical volume in which the digital archive is stored, in the volume management storage region. The write inhibit state setting means record, after the digital archive is stored in the physical volume corresponding with the extracted physical ID, a write inhibit state as the volume state that corresponds with the physical volume in which the digital archive is stored, in the volume management storage region.

According to a third embodiment of the server, in a case where, according to the second embodiment, each of the plurality of storage control systems is provided with a storage region for storing each volume state for each physical volume that the storage control system comprises and a storage control device that controls access from the archive host with respect to each of the physical volumes based on each of the volume states, the server further comprises write inhibit instruction means for instructing the storage control system that comprises the physical volume in which the digital archive is stored to change the volume state of the physical volume in which the digital archive is stored to a write inhibit state.

According to a fourth embodiment of the server, the volume management region further stores a volume state for each of the plurality of physical volumes. The server further comprises replicate destination physical volume selection means and archive replicate means. The replicate destination physical volume selection means select, from among the plurality of physical volumes, a replicate destination physical volume that is capable of storing a digital archive in a replicate source physical volume selected from among the plurality of physical volume on the basis of the volume state. The archive replicate means generate, in the replicate destination physical volume, a replicate of a digital archive in the replicate source physical volume by controlling at least one of a first storage control system comprising the replicate source physical volume and a second storage control system comprising the replicate destination physical volume.

According to a fifth embodiment of the server, disk characteristics relating to a disk-type storage device comprising a physical volume according to the fourth embodiment include high reliability or high performance, and low reliability, which signifies lower reliability than the high reliability disk characteristic, or low performance, which signifies lower performance than the high performance disk characteristic. The volume management storage region stores the disk characteristics for each of the plurality of physical volumes. The replicate destination physical volume selection means select the replicate destination physical volume based on the disk characteristics.

According to a sixth embodiment of the server, the volume management region further stores a volume state for each of the plurality of physical volumes. The server comprises migration destination physical volume selection means and archive migration means. The migration destination physical volume selection means select from among the plurality of physical volumes, based on the volume states, a migration destination physical volume that is capable of storing a digital archive in the migration source physical volume selected from among the plurality of physical volumes. The archive migration means move a digital archive in the migration source physical volume to the migration destination physical volume by controlling at least one of the first storage control system comprising the migration source physical volume and the second storage control system comprising the replicate destination physical volume.

According to a seventh embodiment of the server, disk characteristics relating to a disk-type storage device comprising a physical volume according to the sixth embodiment include high reliability or high performance, and low reliability, which signifies lower reliability than the high reliability disk characteristic, or low performance, which signifies lower performance than the high performance disk characteristic. The volume management storage region stores the disk characteristics for each of the plurality of physical volumes. The migration destination physical volume selection means select the migration destination physical volume based on the disk characteristics.

Further, according to at least one of claims 5 and 7, the server is able to select, as the replicate source physical volume or migration source physical volume, a physical volume whose archive storage deadline terminates after a predetermined period (three days later, for example), a physical volume whose unused storage capacity is less than or more than a predetermined storage capacity (300 MB, for example), a physical volume whose access frequency is lower than or more than a predetermined frequency (fifty times per minute, for example), or a physical volume whose importance is higher than or lower than a predetermined reference ('medium' importance, for example), for example.

Further, for example, the server is able to select, as the replicate destination physical volume or migration destination physical volume, a physical volume whose disk characteristic is high reliability or high performance in a case where the attribute of the replicate source physical volume or migration source physical volume applies to at least one of (1) to (4) below:

(1) the storage deadline is beyond a predetermined period (180 days, for example)

(2) the unused storage capacity is above a predetermined capacity (20 GB, for example);

(3) the access frequency is above a predetermined frequency (50 times per minute, for example); and (4) the importance is above a predetermined reference ('medium' importance, for example).

On the other hand, for example, the server is able to select, as the replicate destination physical volume or migration destination physical volume, a physical volume whose disk characteristic is low reliability or low performance in a case where the attribute of the replicate source physical volume or migration source physical volume applies to at least one of (A) to (D) below:

(A) the storage deadline is beyond a predetermined period (3 days, for example)

(B) the unused storage capacity is smaller than a predetermined capacity (300 MB, for example);

(C) the access frequency is below a predetermined frequency (50 times per minute, for example); and (D) the importance is below a predetermined reference ('medium' importance, for example).

According to another embodiment, the server may further comprise storage deadline setting means for setting, in the volume management storage region, an archive storage deadline that is expressed as a period for a certain physical volume on which the digital archive is stored; first duration detection means for detecting a first duration, which is a duration from the time the digital archive is saved in the certain physical volume until the current time; second duration detection means for detecting a second duration, which is a duration over which the storage control system comprising the certain physical volume is stopped; third duration calculation means for calculating a third duration, which is the difference between the first duration and the second duration; and erasure means for comparing the third duration thus calculated with a period expressed by the archive storage deadline set for the certain physical volume, judging whether the third duration is equal to or more than the period and, when the judgment result is affirmative, erasing the digital archive in the certain physical volume. Further, in this case, the storage deadline setting means may set, in the volume management storage region, an archive storage deadline that is expressed in a format that is selected by the user from a period and a deadline. If the archive storage deadline is expressed in deadline format, the erasure means may compare the current date and time with the deadline expressed by the archive storage deadline, judge whether the current date and time is at or beyond the deadline and, when the judgment result is affirmative, erase the digital archive in the certain physical volume, whereas, if the archive storage deadline is expressed in period format, the erasure means may compare the third duration and the period.

According to another embodiment, the server may further comprise erasure method selection means for selecting a data erasure method from among data erasure methods of a plurality of types; and erasure means for erasing the digital archive in the physical volume according to the data erasure method thus selected.

According to another embodiment, each of the plurality of storage control systems may manage volume attribute information for each of two or more physical volumes that each of the plurality of storage control systems comprises. The volume management storage region may store volume attribute information for each of the plurality of physical volumes. The server may further comprise archive generation means for controlling at least one of a first storage control system that comprises a first physical volume and a second storage control system that comprises a second physical volume to generate the digital archive in the first physical volume in the second physical volume; and volume attribute information transmission means for transmitting volume attribute information corresponding with the first physical volume to the second storage control system. The volume attribute information transmission means may acquire volume attribute information corresponding with the first physical volume from the volume management storage region and then transmit the acquired volume attribute information or the transmission of the volume attribute information may be performed by ordering the first storage control system to transmit the volume attribute information from the first storage control system to the second storage control system.

According to this embodiment, the archive generation means can shift the digital archive in the first physical volume to the second physical volume. The server can further comprise attribute information deletion means, which, when the digital archive is shifted from the first physical volume to the second physical volume, delete the volume attribute information corresponding with the first physical volume from the volume management storage region or the first storage control system. Following the deletion of the volume attribute information (the volume state 'read only', for example) new volume attribute information (the volume state 'read/writable', for example) may be associated with the first physical volume.

The storage system according to a first aspect of the present invention comprises a plurality of storage control systems that comprise disk-type storage devices in which a digital archive is stored, an archive host that outputs the digital archive, and a server connected to the plurality of storage control systems. A plurality of physical volumes constituting storage regions for storing a digital archive are provided in two or more of the disk-type storage devices that the plurality of storage control systems comprise. One or more physical IDs, each of which is allocated to one or more physical volumes that the storage control systems comprise among the plurality of physical volumes, are managed by the individual storage control systems. A plurality of logical IDs, each of which is allocated to the plurality of physical volumes, is managed by the archive host. The server comprises a volume management storage region that stores the logical ID, the physical ID, and a control system ID of a storage control system that comprises the physical volume, for each of the plurality of physical volumes; extraction means, which, when the designation of a logical ID selected from among the plurality of logical IDs is received from the archive host, extract the physical ID and control system ID that correspond with the received logical ID from the volume management storage region; and access path reporting means for reporting, to the archive host, access path information for accessing the physical volume with the physical ID, this access path information being based on the physical ID and control system ID thus extracted. The storage control system comprises means for receiving a write command or read command based on the reported access path information from the archive host; first storage control means that, when the write command is received, store the digital archive in a physical volume that has the physical ID specified by the access path information; and second storage control means that, when the read command is received, read the digital archive from the physical volume that has the physical ID specified by the access path information and send the digital archive to the archive host.

Here, examples of the storage control system can include a disk array device, fiber channel switch, or the like. Examples of the archive host can include a personal computer, mainframe, or other computer.

According to one embodiment of the storage system, the storage control system comprises a host connection section (LUN described subsequently, for example) connected to the archive host; and a volume pool that comprises one or more physical volumes that are not logically connected to the host connection section. The server further comprises connect instruction means for outputting a connect instruction for a logical connection of the physical volume corresponding with the determined physical ID to the host connection section, to a storage control system specified by the acquired control system ID; and disconnect instruction means, which, after the archive host has accessed the physical volume corresponding with the extracted physical ID, output a disconnect instruction to break the connection between the physical volume corresponding with the acquired physical ID and the host connection section, to a storage control system that is specified by the extracted control system ID. The storage control system further comprises connection means that, when the connect instruction is received from the server, select the physical volume corresponding with the extracted physical ID from the volume pool and logically connect the selected physical volume to the host connection section; and disconnection means that, when the disconnect instruction is received from the server, break the logical connection between the physical volume corresponding with the acquired physical ID, and the host connection section.

Each of the aforementioned means provided in at least one of the server according to the first aspect of the present invention and the storage system according to the second aspect of the present invention is constituted by hardware (devices, electrical circuits, and electronic circuits, for example), computer programs, and by a combination of hardware and computer programs, for example. A server according to another aspect of the present invention can be rendered as follows, for example.

A server that communicates with an archive host that outputs a digital archive and with a plurality of storage control systems that comprise disk-type storage devices in which the digital archive is stored, in which: a plurality of physical volumes constituting storage regions for storing a digital archive are provided in two or more of the disk-type storage devices that the plurality of storage control systems comprises; one or more physical IDs, each of which is allocated to one or more physical volumes that the storage control systems comprise among the plurality of physical volumes, are managed by the individual storage control systems; and a plurality of logical IDs, each of which is allocated to the plurality of physical volumes, are managed by the archive host, the server comprising: one or more computers; a volume management storage region that stores the logical ID, the physical ID, and a control system ID of a storage control system that comprises the physical volume, for each of the plurality of physical volumes; a tracking program run by any of the one or more computers and which, when the designation of a logical ID selected from among the plurality of logical IDs is received from the archive host, tracks the physical ID and control system ID that correspond with the received logical ID from the volume management storage region; and an access path reporting program run by any of the one or more computers and which reports, to the archive host, access path information for accessing the physical volume with the physical ID, this access path information being based on the physical ID and control system ID thus extracted.

A method according to a third aspect of the present invention, in which a plurality of physical volumes constituting data storage regions provided in two or more disk-type storage devices that a plurality of storage control systems comprises are provided; one or more physical IDs, each of which is allocated to one or more physical volumes that the storage control systems comprise among the plurality of physical volumes, are managed by the individual storage control systems; and a plurality of logical IDs, each of which is allocated to the plurality of physical volumes, are managed by an archive host that outputs a digital archive, the method comprising: a step in which the archive host sends a logical ID selected from among the plurality of logical IDs to a server; a step in which the server extracts a physical ID and control system ID corresponding with the logical ID received from the archive host from a volume management storage region that stores, for each of the plurality of physical volumes, the logical ID, the physical ID, and the control system ID of the storage control system that comprises the physical volume; a step in which the server reports access path information for accessing the physical volume with the physical ID to the archive host, this access path information being based on the extracted physical ID and control system ID; a step in which the archive host sends a write command or read command based on the reported access path information to the storage control system; a step in which, when the write command is received, the storage control system stores a digital archive that contains the write command in the physical volume with the physical ID specified by the access path information; and a step in which, when the read command is received, the storage control system reads a digital archive from the physical volume with the physical ID specified by the access path information and sends the digital archive to the archive host.

BRIEF DESCRIPTION OF THE DRAWINGS

FIG. 1 is a block diagram showing the constitution of an archive management system according to this embodiment;

FIG. 2 shows an example of the constitution of a logical VOL management table 925 and an archive attribute table 927 that are stored in a host storage device 915 of the archive host 903;

FIG. 3 shows an example of the constitution of a physical VOL management table 941, a LUN management table 943, and a control system attribute 945 that are stored in a storage control memory 937 of a storage control system 909;

FIG. 4 shows an example of the constitution of a logical-physical VOL management table 953 and a LUN management table 955 among a plurality of tables stored in a server storage device 947 of an archive management server 905;

FIG. 13 shows the flow of the migration processing of the content archive 923;

FIG. 15 shows an example of the flow of processing for setting a storage deadline;

FIG. 18 shows an example of the processing to associate attribute information of a replicate source physical VOL of the content archive with a replicate destination physical VOL according to a third modified example of the first embodiment of the present invention; and FIG. 19 shows an example of the processing to associate attribute information of a migration source physical VOL of the content archive with a migration destination physical VOL according to the third modified example of the first embodiment of the present invention.

DETAILED DESCRIPTION OF THE PREFERRED EMBODIMENTS

Figure 5:
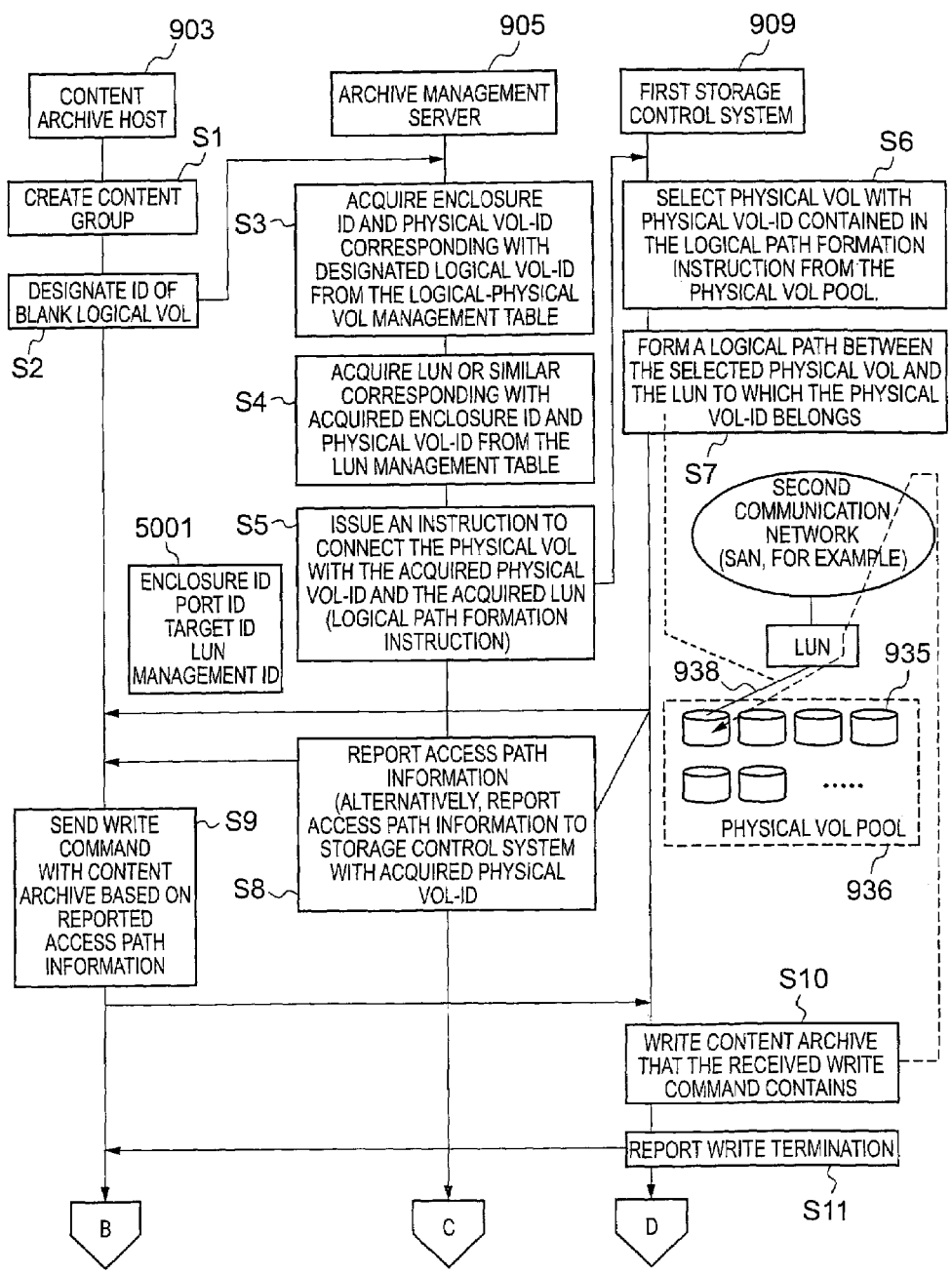
FIG. 5 shows the flow of processing that is performed when a content archive 923 is stored in a physical VOL.

An embodiment of the present invention will be described below with reference to the drawings.

FIG. 1 is a block diagram showing the constitution of the archive management system according to this embodiment.

A digital archive that is managed by the archive management system according to this embodiment is a content archive that contains one or a plurality of digital content items (electronic mail or data files, for example), for example. More specifically, for example, a content archive is a recording medium image that displays the results of storing such a data group on a recording medium such as a DVD or CD.

According to this embodiment, one or a plurality of content servers 901, one or a plurality of content archive hosts 903, an archive management server 905, and one or a plurality of storage control systems 909 are each connected to a first communication network (the Internet or a LAN, for example) 1. Further, one or a plurality of content archive hosts 903, and a plurality of storage control systems 909 constituting a storage control system pool 907 are connected to a second communication network (a SAN, for example) 911.

The content server 901 is a computer device that comprises a CPU (Central Processing Unit), a memory, and other information processing resources, and is a personal computer, a workstation or a mainframe, or the like, for example. The storage resources of the content server 901, such as the memory or hard disk thereof (the 'content box' hereinafter) 913, store a plurality of digital content items. The content server 901 sends the digital content in the content box 913 to the content archive host 903 via the first communication network 1.

The content archive host 903 is a computer device that comprises a CPU, a memory, and other information processing resources, and is a personal computer, a workstation or a mainframe, or the like, for example. The content archive host 903 comprises a host storage device (a hard disk, for example) 915, a host memory 917, and a host control unit (a CPU, for example) 919.

The host storage device 915 comprises a digital content storage region 921, one or a plurality of content archives 923, a logical VOL management table 927, and the archive attribute table 925. Digital content received from the content server 901 is stored in the digital content storage region 921. The content archive 923 is a data archive in which one or a plurality of digital content items in the digital content storage region 921 is contained. The logical VOL management table 927 and the archive attribute table 925 will be described subsequently.

The host memory 917 comprises a storage region for a plurality of computer programs read to the host control unit 919, and a work region for the host control unit 919, for example. Archive software 929 and an archive encryption processing program 931, for example, are stored in the computer program storage region. The archive software 929 is software that performs processing to create one content archive 923 based on one or a plurality of digital content items in the digital content storage region 921. The archive encryption processing program 931 is a computer program that encrypts the content archive 923 when same is sent to the storage control system 909.

The host control unit 919 reads the computer programs stored in the host memory 917 and performs characteristic information processing on the computer programs thus read. For example, when the host control unit 919 reads the archive software 929, same is able to perform processing to create one content archive 923 based on one or a plurality of digital content items in the digital content storage region 921. Further, when the host control unit 919 reads the archive encryption processing program 931, same is able to perform processing to encrypt the content archive 923 sent to the storage control system 909.

Each storage control system 909 is a system that comprises one or more disk-type storage devices (or magnetic tape recording devices). More specifically, for example, the storage control systems 909 are a RAID (Redundant Array of Independent Inexpensive Disks) system that is constituted by arranging a multiplicity of disk-type storage devices in the form of an array. The storage control system 909 comprises a plurality of disk-type storage devices 933, the storage control memory 937, and a storage control device 939.

Two or more physical volumes (suitably termed 'physical VOL' hereinafter) 935 are provided in a plurality of disk-type storage devices 933. Each physical volume comprises a logical storage region based on a physical storage region in the disk-type storage device 933, sometimes also referred to as an LU (Logical Unit) or LDEV (Logical DEVice).

The physical VOL management table 941, LUN management table 943, and control system attribute data 945, for example, are stored in the storage control memory 937. The physical VOL management table 941, LUN management table 943, and control system attribute data 945 will be described subsequently.

The storage control device 939 is constituted as a microcomputer system that comprises a CPU, memory, and so forth, for example, and analyzes and executes various commands received from the content archive host (hereinafter 'archive host') 903 or the archive management server 905. The memory in the storage control device 939 comprises a storage region for a plurality of computer programs read to the CPU, for example, a CPU work region, and so forth.

The archive management server 905 is a computer device that comprises a CPU or memory, or other information processing resources, for example, being constituted as a personal computer, workstation, mainframe, or the like, for example. The archive management server 905 comprises information inputting devices (not shown) such as a keyboard switch, pointing device, and microphone, for example, and information outputting devices (not shown) such as a monitor display and speakers, for example. The archive management server 905 controls the introduction and extraction of the content archive 923 by the content archive host 903 to/from physical VOL in the storage control system pool 907, and manages the relationships between the subsequently described physical VOL-ID and logical VOL-ID that the physical VOL in the storage control system pool 907 have, and so forth. The archive management server 905 comprises a server storage device (hard disk, for example) 947, a server memory 949, and a server control unit (CPU, for example) 951.

The server storage device 947 stores the logical-physical VOL management table 953, the LUN management table 955, the replication management table 957, and the physical VOL attribute table 959 (a detailed description of these tables will be provided subsequently). Further, one or a plurality of control system attribute data corresponding with one or a plurality of respective storage control systems 909 contained in the storage control system pool 907 may be stored in the server storage device 947. The archive management server 905 is able to issue an instruction based on control system attribute data (enclosure ID, for example) corresponding with the storage control system when a disconnect instruction (described subsequently) or similar is issued to each storage control system.

The server memory 949 comprises a storage region for a plurality of computer programs read to a server control unit 951, and a work region for the server control unit 951, for example. Stored in the computer program storage region are a read/write control program 961, a storage deadline management program 963, a replication management program 961, a storage deadline management program 963, a replication management program 965, and a migration management program 967, for example. The read/write control program 961 is a computer program for controlling the passage of content archives exchanged between the archive host 903 and the storage control system 909. The storage deadline management program 963 is a computer program for managing the content archive storage deadline (hereinafter called simply the 'storage deadline') for each physical VOL established in the logical-physical VOL management table 953. The replication management program 965 is a computer program for performing processing to generate a replicate of a digital archive in a certain physical VOL that exists in a certain storage control system 909 in another physical VOL. The migration management program 967 is a computer program for performing processing to move a digital archive in a certain physical VOL that exists in a certain storage control system 909 in another physical VOL.

The server control unit 951 reads a computer program stored in the server memory 949 and performs information processing that is peculiar to the computer program thus read. For example, when the read/write control program 961 is read, the server control unit 951 is able to control the passage of content archives exchanged between the archive host 903 and the storage control system 909. Further, for example, the server control unit 951 is able to manage a storage deadline for each physical VOL that is established in the logical-physical VOL management table 953 when the storage deadline management program 963 is read. In addition, for example, when the replication management program 965 is received, the server control unit 951 is able to perform processing to generate a replicate of a digital archive in a certain physical VOL that exists in a certain storage control system 909 in another physical VOL, and other processing. Further, for example, when the migration management program 967 is read, the server control unit 951 is able to perform processing to move a digital archive in a certain physical VOL that exists in a certain storage control system 909 to another physical VOL, and other processing.

An outline of the archive management system according to this embodiment was provided above.

In this embodiment, one or a plurality of storage control systems are managed as one storage control system pool 907. Further, according to this embodiment, as will be described subsequently, the archive host 903 is able to store a digital archive in a physical VOL even when it has not been determined what kind of storage control system exists in the storage control system pool 907.

FIG. 2 shows an example of the constitution of the logical VOL management table 925 and the archive attribute table 927 that are stored in the host storage device 915 of the archive host 903.

As shown in FIG. 2(A), a plurality of archive names that correspond with a plurality of logical VOL-ID are registered in the logical VOL management table 925.

Here, the logical VOL-IDs are IDs allocated to each of the plurality of physical VOL 935 that exist in the storage control system pool 907, these logical VOL-IDs being recognized by the archive host 903. The logical VOL-IDs may be a set of physical VOL-IDs and enclosure IDs (described subsequently), or may be IDs prepared separately from these IDs. Duplicate logical VOL-IDs are not present in the storage control system pool 907. If the archive host 903 (the archive software 929 read to the host control unit 919, for example) selects a desired logical VOL-ID from among the plurality of logical VOL-IDs written to the logical VOL management table 925 and specifies this logical VOL-ID to the archive management server 905, the desired content archive 923 can be stored in the storage control system pool 907. In other words, there is no need for the archive host 903 to determine the physical constitution, such as what kind of storage control system exists in the storage control system pool 907.

The name of the archive corresponding with the logical VOL-ID is the name of a digital archive that exists in the physical VOL 935 to which this logical VOL-ID has been allocated (but is not limited to a name, other identifying information also being acceptable). Further, when an archive name corresponding with a logical VOL-ID is not present and the field is blank in the logical VOL management table 925, this indicates that the content archive 923 generated by the archive host 903 is not present in the physical VOL 935 corresponding with the logical VOL-ID and the physical VOL 935 is blank.

As shown in FIG. 2(B), a plurality of archive attributes that correspond with a plurality of archive names are registered in the archive attribute table 927. An archive attribute of the content archive 923 is an attribute relating to the content archive 923, and is the storage deadline of the content archive 923, for example.

FIG. 3 shows an example of the constitution of the physical VOL management table 941, LUN management table 943, and control system attributes 945 that are stored in the storage control memory 937 of the storage control system 909.

As shown in FIG. 3(A), the two or more storage control system physical VOL information items, which correspond with two or more physical VOL that exist in the storage control system 909, are registered in the physical VOL management table 941 of each storage control system 909. The storage control system physical VOL information of each physical VOL 935 is attribute information relating to the physical VOL, and includes the physical VOL-ID, and the state and storage capacity, for example.

Here, the physical VOL-ID is identifying information for the physical VOL 935 and needs to be recognizable within the storage control system 909 that comprises the physical VOL 935, but need not be recognized within the archive host 903 (in other words, the physical VOL-ID may be concealed from the archive host 903. That is, the physical VOL-ID and the above-mentioned logical VOL-ID are common from the perspective of being IDs that are allocated to the physical VOL 935 but differ with regard to the need to be recognizable within the archive host 903.

States of the physical VOL 935 include a plurality of types of state, such as 'RO (Read Only)', in which writing is inhibited but reading is permitted, 'RW (Read Write)', in which both writing and reading are permitted, and 'Free', which indicates that the physical VOL 935 is blank, for example.

As shown in FIG. 3(B), one or more LUN information items that correspond with one or more respective LUN (Logical Unit Numbers) that exist in the storage control system 909 are recorded in the LUN management table 943 of each storage control system 909. The LUN information items for each LUN include the port ID (the ID of the communication port to which the archive host 903 is connected) and target ID of the LUN, the LUN itself, the storage capacity that is supplied when the LUN is designated, and the physical VOL-IDs of one or more physical VOL (physical VOL-ID group) that can be connected to the LUN.

As shown in FIG. 3(C), control system attribute data 945 of respective storage control systems 909 include, as an attribute that relates to the storage control system 909, the enclosure ID (in other words, the IDs of the storage control systems 909), for example. The enclosure ID may be any kind of enclosure ID as long as same is information that makes it possible to specify the storage control system 909. Address information (one example of which is an IP address, MAC address, or WWN (World Wide Name)) can be adopted, for example.

FIG. 4 shows an example of the constitution of the logical-physical VOL management table 953 and the LUN management table 955 among a plurality of tables stored in a server storage device 947 of an archive management server 905.

As shown in FIG. 4(A), server physical VOL information corresponding with a plurality of logical VOL-IDs is recorded in the logic-physical VOL management table 953. Server physical VOL information of each logical VOL-ID is attribute information relating to the physical VOL 935 to which this logical VOL-ID has been allocated, and includes the enclosure ID, physical VOL-ID, status, storage deadline, full storage capacity/unused capacity, expiry action, access frequency and importance, for example.

The enclosure ID corresponding with the logical VOL-ID is the ID of the storage control system 909 that comprises the physical VOL 935 to which this logical VOL-ID has been allocated. The enclosure ID can be pre-registered.

The physical VOL-ID corresponding with the logical VOL-ID is the physical VOL-ID of the physical VOL 935 to which the logical VOL-ID has been allocated. The physical VOL-ID can be suitably updated in the event that an old disk-type storage device 933 is substituted for a new disk-type storage device 933, and so-forth.

The status corresponding with the logical VOL-ID is the status of the physical VOL 935 to which the logical VOL-ID has been allocated (RO, RW or Free, for example). The status can be suitably updated by the read/write control program 961 that is read to the server control unit 951, for example.

The storage deadline corresponding with the logical VOL-ID is the storage deadline of the content archive 923 in the physical VOL 935 to which the logical VOL-ID has been allocated. A variety of methods can be adopted to express the storage deadline. For example, the storage deadline may be expressed by the number of days, or expressed by the year/month/day.

The full storage capacity/unused capacity corresponding with the logical VOL-ID expresses the storage capacity of the physical VOL 935 to which the logical VOL-ID has been allocated and the unused storage capacity within this storage capacity. The full storage capacity/unused capacity can be suitably updated by the read/write control program 961 read to the server control unit 951, for example.

The expiry action corresponding with the logical VOL-ID indicates what kind of processing is to be performed when the storage deadline corresponding with the physical VOL 935 to which this logical VOL-ID has been allocated expires. Expiry actions include data erasure (the deletion of the content archive in the corresponding physical VOL 935), and the alert issue (the reporting of the storage deadline expiry to the user by means of various methods such as electronic mail), for example. In cases where the expiry action is data erasure, the read/write control program 961 read to the server control unit 951 erases the content archive in the physical VOL 935 whose storage deadline has expired (thereafter, the status of the physical VOL 935 may be set to 'Free' or 'RW'), for example. Furthermore, when the expiry action is to issue an alert, the read/write control program 961 read to the server control unit 951 sends an electronic mail recording the fact that the storage deadline of the content archive 923 has expired (hereinafter the 'storage deadline expiry report mail) to the archive host 903 that outputs the content archive 923 in the physical VOL 935 whose storage deadline has expired. Further, in this case, the electronic mail address of the archive host 903 is registered in the server memory 949 or the server storage device 974 and a storage deadline expiry report mail is sent on the basis of this electronic mail address.

The access frequency corresponding with the logical VOL-ID is the access frequency of the archive host 903 for the physical VOL 935 to which this logical VOL-ID has been allocated. The access frequency indicates how many times access is made over a predetermined period (one day, for example), for example. The access frequency can be updated each time writing or reading is performed with respect to the physical VOL 935 by the read/write control program 961 that is read to the server control unit 951, for example.

The importance corresponding with the logical VOL-ID indicates the importance of the content archive 923 in the physical VOL 935 to which the logical VOL-ID has been allocated. The importance can be expressed by means of a plurality of levels (three levels, which are high, medium, and low, for example).

As shown in FIG. 4(B), a plurality of LUN (Logical Unit Number) information items corresponding with a plurality of LUN that exist in the storage control system pool 907 are recorded in the LUN management table 957. The LUN information items for each LUN include the enclosure ID of the storage control system 909 with this LUN, the port ID and target ID corresponding with this LUN, the LUN itself, and the physical VOL-IDs (group of physical VOL-IDs) of one or more physical VOL capable of connecting to the LUN, for example.

The following processes (1) to (3) of this embodiment will be described below:

(1) process performed when writing (or reading) digital archive 923;

(2) process performed in replicate management; and (3) process performed in migration management.

(1) Process Performed When Writing (or Reading) Digital Archive 923

The flow of the process performed when the content archive 923 is stored in a physical VOL will be described hereinbelow with reference to FIGS. 5 and 6.

As shown in FIG. 5, the archive host 903 (the host control unit 919 that reads the archive software 929, for example) creates one content archive 923 based on one or a plurality of digital content items in the digital content storage region 921 (step S1) and stores the content archive 923 thus created in the host storage device 915.

The archive host 903 references the logical VOL management table 927 in the host storage device 915, selects the desired logical VOL-ID from among one or more logical VOL-IDs corresponding with one or more physical VOL 935 in a blank state, and specifies the selected VOL-ID to the archive management server 905 (S2).

The archive management server 905 (the server control unit 951 to which the read/write control program 961 is read, for example)references the logical-physical VOL management table 953 in the server storage device 947 with the logical VOL-ID specified by the archive host 903 serving as the search key, and judges whether it is possible to write a content archive 923 to the physical VOL 935 corresponding with the logical VOL-ID (whether the state of the physical VOL 935 is at least one of 'RW' and 'Free', for example).

When, as a result of this judgment, writing is permitted, the archive management server 905 acquires the physical VOL-ID and enclosure ID corresponding with the specified logical VOL-ID from the logical-physical VOL management table 953 (S3).

Next, the archive management server 905 acquires the LUN or the like with the acquired enclosure ID and physical VOL-ID from the LUN management table 957 (S4).

Subsequently, the archive management server 905 issues an instruction (hereinafter 'logical path formation instruction') to form a logical path based on the LUN and physical VOL-ID thus acquired to a first storage control system 909 with the acquired enclosure ID via a first communication network (a LAN, for example) (S5).

Within the first storage control system 909 that received the logical path formation instruction from the archive management server 905 (the storage control device 939, for example), a logical path is not formed between a LUN and a physical VOL before a logical path formation instruction is received.

In response to the logical path formation instruction thus received, the first storage control system 909 selects the physical VOL 935 that has the physical VOL-ID contained in the logical path formation instruction from a physical VOL pool 936 that comprises a plurality of physical VOL 935 that are not connected to the LUN (S6). The first storage control system 909 then forms a logical path 938 between the selected physical VOL 935 and the LUN contained in the logical path formation instruction (S7). More specifically, for example, the first storage control system 909 associates the physical VOL-ID of the selected physical VOL 935 and the LUN contained in the logical path formation instruction in the physical VOL management table 937.

The archive management server 905 reports access path information (information that includes an enclosure ID, port ID, target ID, LUN and physical VOL-ID, for example) 5001 for access to the physical VOL 935 corresponding with the physical VOL-ID to the archive host 903, on the basis of the physical VOL-ID and enclosure ID thus acquired (S8).

The archive host 903 generates a write command that contains the content archive 923 in the host storage device 915 (a write command according to the SCSI protocol, for example) based on the access path information 5001 thus reported, and then sends the generated write command to the first storage control system 909 (S9).

The first storage control system 909 writes the content archive 923 in the received write command to the physical VOL 935 corresponding to the logical path 938 thus formed (that is, the physical VOL 935 corresponding with the logical VOL-ID specified by the archive host 903) (S10). When writing is complete, the first storage control system 909 reports writing completion to the archive host 903 (S11).

Figure 6:
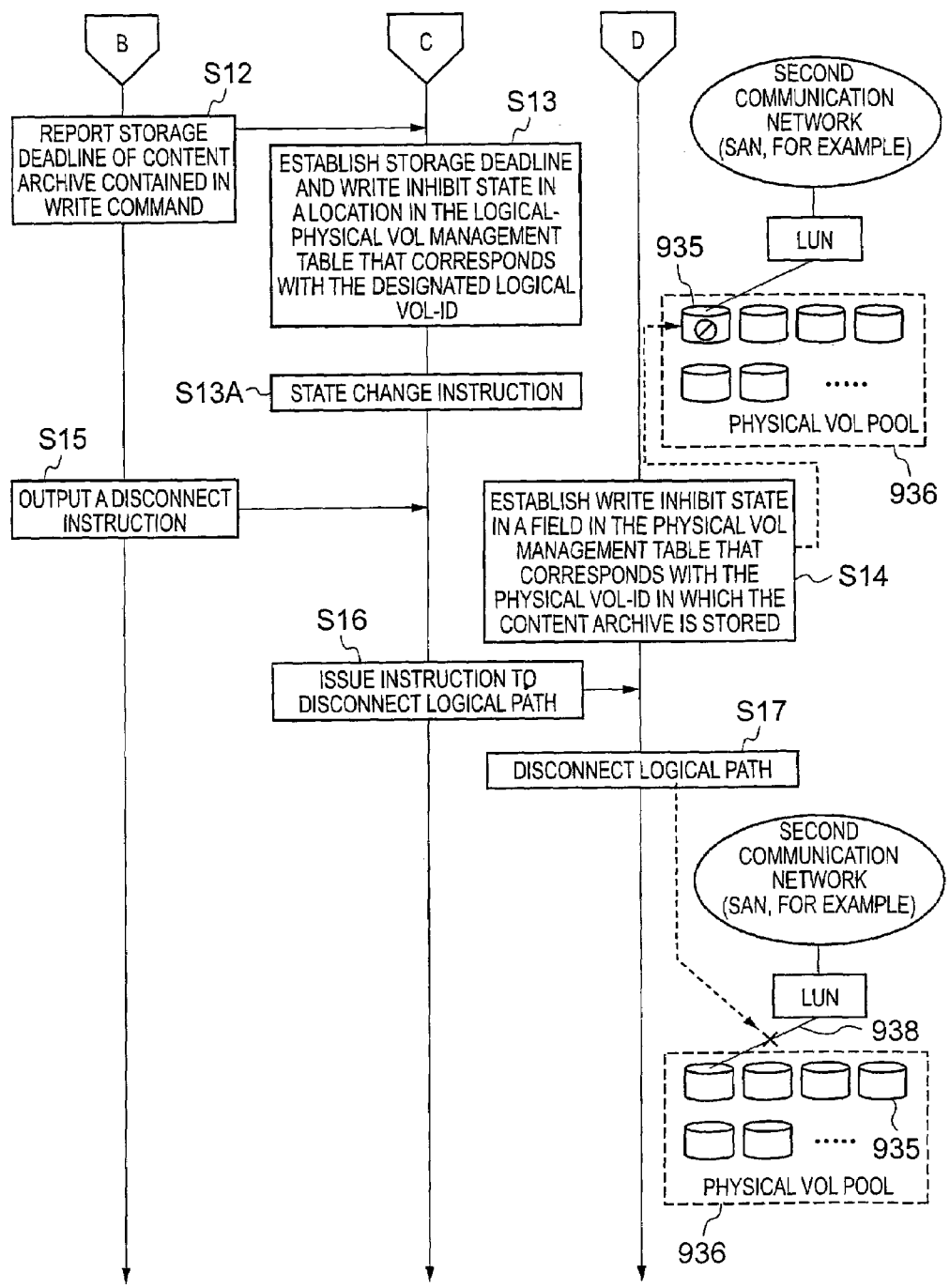
FIG. 6 shows the flow of processing that is performed when the content archive 923 is stored in a physical VOL.

Upon receiving a writing completion report from the first storage control system 909, the archive host 903 acquires the storage deadline corresponding with the archive name of the content archive 923 thus sent from the archive attribute table 925 as shown in FIG. 6, and reports the acquired storage deadline along with the logical VOL-ID specified in S2 to the archive management server 905 (S12).

The archive management server 905 establishes the reported storage deadline and the write inhibit state (state 'RO', for example) in locations in the logical-physical VOL management table 953 that correspond with the logical VOL-ID thus reported (S13). Further, the archive management server 905 issues an instruction to render the state of the physical VOL-ID corresponding with the logical VOL-ID (hereinafter a 'state change instruction') to the first storage control system 909 (S13A).

The first storage control system 909 establishes a write inhibit state (a state 'RO', for example) in locations in the physical VOL management table 941 that correspond with the physical VOL-ID contained in the state change instruction (S14) Accordingly, control is exercised so that data is not written to a physical VOL 935 in the write inhibit state by means of a microprogram of the storage control device 939 of the first storage control system 909, for example.

The archive host 903 issues an instruction (hereinafter 'disconnect instruction') to break the connection between the archive host 903 and the first storage control system 909 to the archive management server 905 (S15).

The archive management server 905 issues, to the first storage control system 909, an instruction (hereinafter 'disconnect instruction') to disconnect the logical path 938 thus formed in response to a disconnect instruction from the archive host 903 (S16).

The first storage control system 909 breaks the logical path 938 thus formed (in other words, cancellation of the logical path 938) in response to the disconnect instruction from the archive management server 905 (S17).

According to the above process flow, the content archive 923 created by the archive host 903 is stored in the physical VOL 935 in the storage control system 909.

Further, although the flow of the processing performed when the content archive 923 is read out is not illustrated in particular, a person skilled in the art is able to understand the process flow when the content archive 923 is read by referencing the above description and FIGS. 5 and 6. That is, frankly speaking, the archive host 903 judges, from the logical VOL management table 927, the logical VOL-ID of the physical VOL 935 hidden by the content archive 923 to be read. If the judged logical VOL-ID is specified to the archive management server 905, a logical path is formed within the storage control system 909 by S3 to S7, and if the archive host 903 then issues a read command based on the logical path, the content archive 923 designated by the read command is supplied to the archive host 903.

Further, according to this embodiment, the relationship between the logical VOL-ID and physical VOL-ID is suitably updated.

Figure 7:
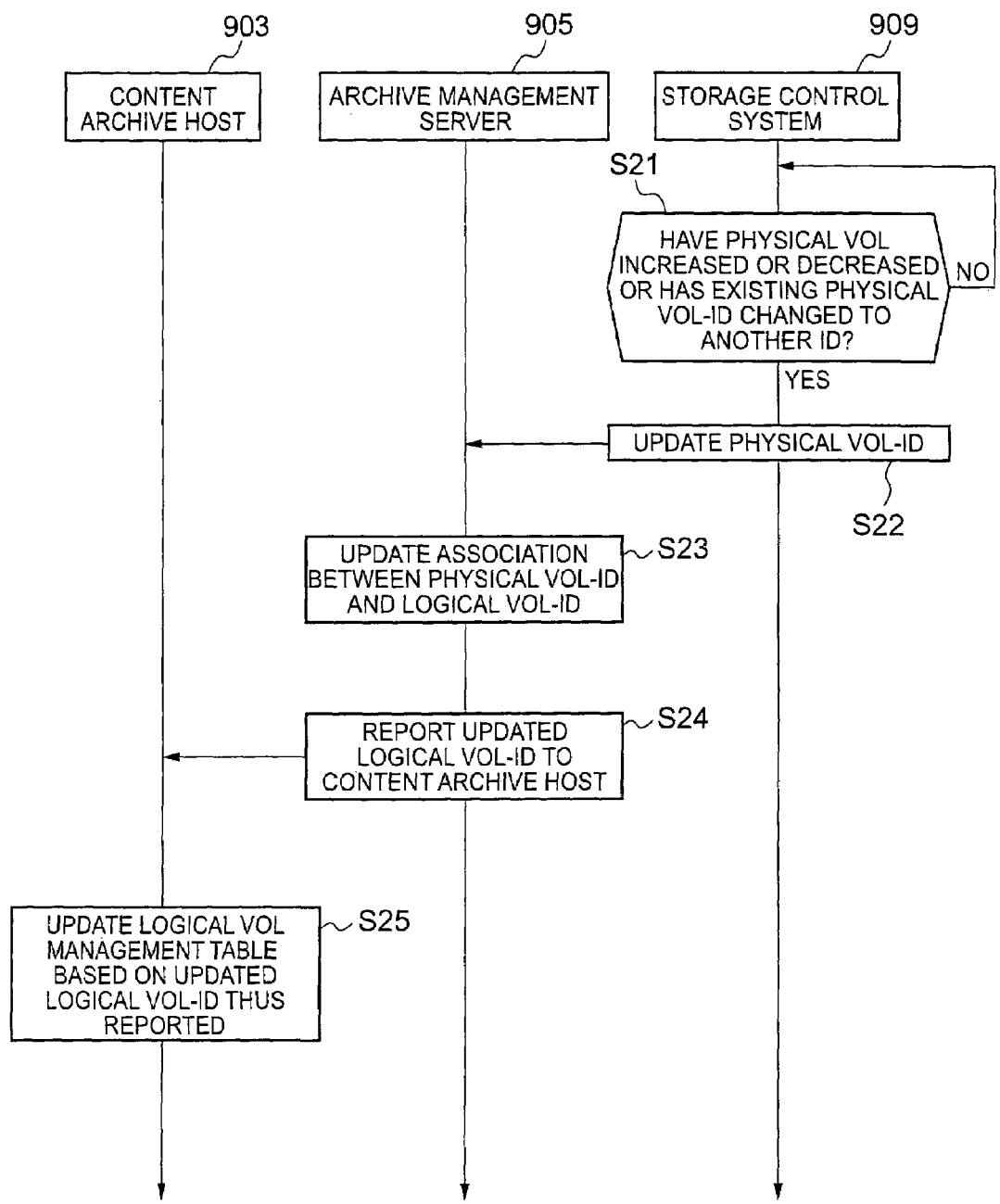
FIG. 7 shows an example of the flow of processing that is performed when the relationship between the logical VOL-ID and physical VOL-ID is updated.

FIG. 7 shows an example of the flow of processing that is performed when the relationship between the logical VOL-ID and physical VOL-ID is updated.

When a physical VOL in the storage control system 909 is increased or reduced or when an existing physical VOL-ID is changed to another ID (when the disk-type storage device 933 is expanded or switched, for example) (Y in S21), the updated physical VOL-ID is registered in the storage control memory 937 of the storage control system 909 (a physical VOL-ID is added, erased, or changed in the storage control memory 937, for example) (S22). The storage control system 909 reports physical VOL update information relating to the updated physical VOL-ID (the physical VOL-ID before or after same is added, erased or changed, for example) to the archive management server 905.

The archive management server 905 updates the association between the logical VOL-ID and the physical VOL-ID in the logical-physical VOL management table 953 on the basis of the physical VOL-ID update information thus reported, and the enclosure ID corresponding with the storage control system 909 that is the transmission source of this information (S23). More specifically, for example, when the added physical VOL-ID is received, the archive management server 905 prepares a new logical VOL-ID corresponding with the physical VOL-ID and then records the new logical VOL-ID in the logical-physical VOL management table 953 by associating the logical VOL-ID and physical VOL-ID. Further, for example, upon receiving the erased physical VOL-ID, the archive management server 905 erases the record that corresponds with the physical VOL-ID (that is, the logical VOL-ID or the like) from the logical-physical VOL management table 953. In addition, for example, when the physical VOL-ID before and after the change are received, the archive management server 905 changes the logical VOL-ID corresponding with the physical VOL-ID before the change to the other ID.

The archive management server 905 then reports logical VOL-ID update information relating to the updated logical VOL-ID (the logical VOL-ID before and after same is added, erased, or changed, for example) to the archive host 903 (S24)

The archive host 903 updates the content of the logical VOL management table 927 on the basis of the received logical VOL-ID update information (S25).

(2) Process Performed in Replicate Management

Furthermore, a description will be provided next for the process that is performed in replicate management.

Figure 8:
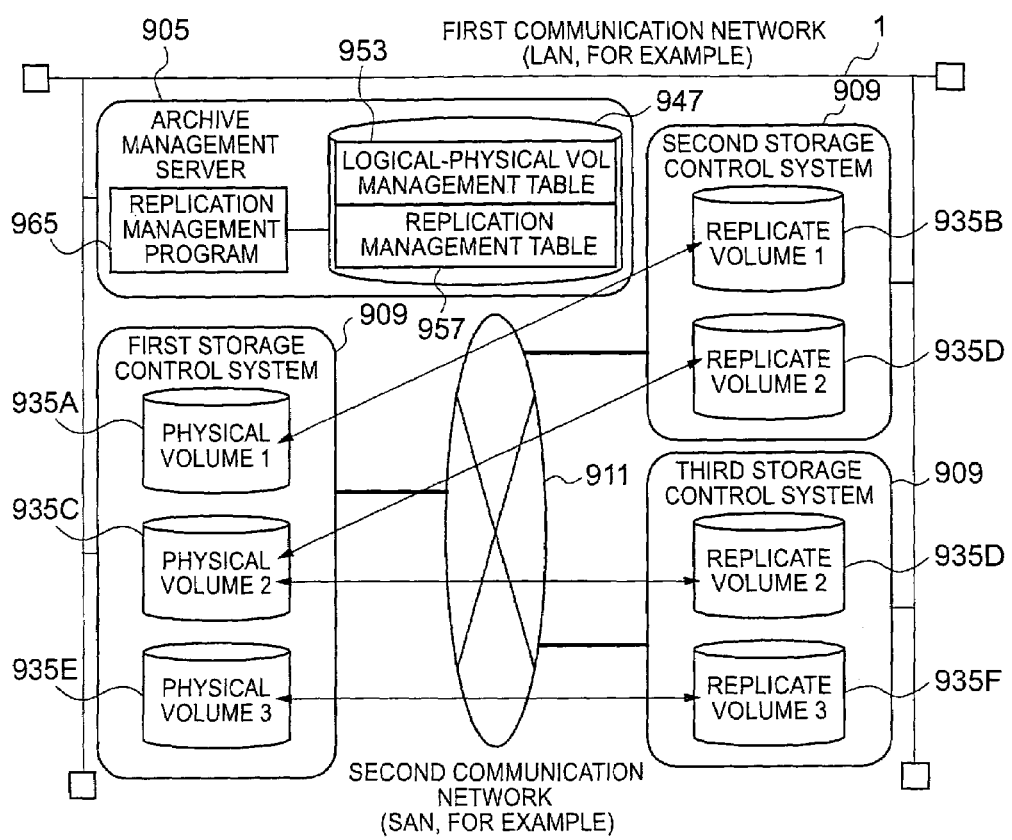
FIG. 8 shows an example of a concept relating to replicate management of this embodiment.

FIG. 8 shows an example of a concept relating to replicate management of this embodiment.

According to the archive management system relating to this embodiment, the replication management program 965 thus read to the server control unit 951 of the archive management server 905 manages replicate relationships such as to which physical VOL 935 of which storage control system 909 to replicate the content archive 923 in a particular physical VOL 935 in a particular storage control system 909, based on the logical-physical VOL management table 953 and the replication management table 957 in the server storage device 947.

According to the example in FIG. 8, the existence of a replicate, in a replicate VOL (physical VOL) 935B of the second storage control system 909, of the content archive 923 that exists in a physical VOL 935A in the first storage control system 909, and the existence of a replicate, in a replicate VOL 935D of a second storage control system 909 and in a replicate VOL 935D of a third storage control system 909, of the content archive 923 that exists in a physical VOL 935C in the first storage control system 909, and so forth, is managed.

Figure 9:
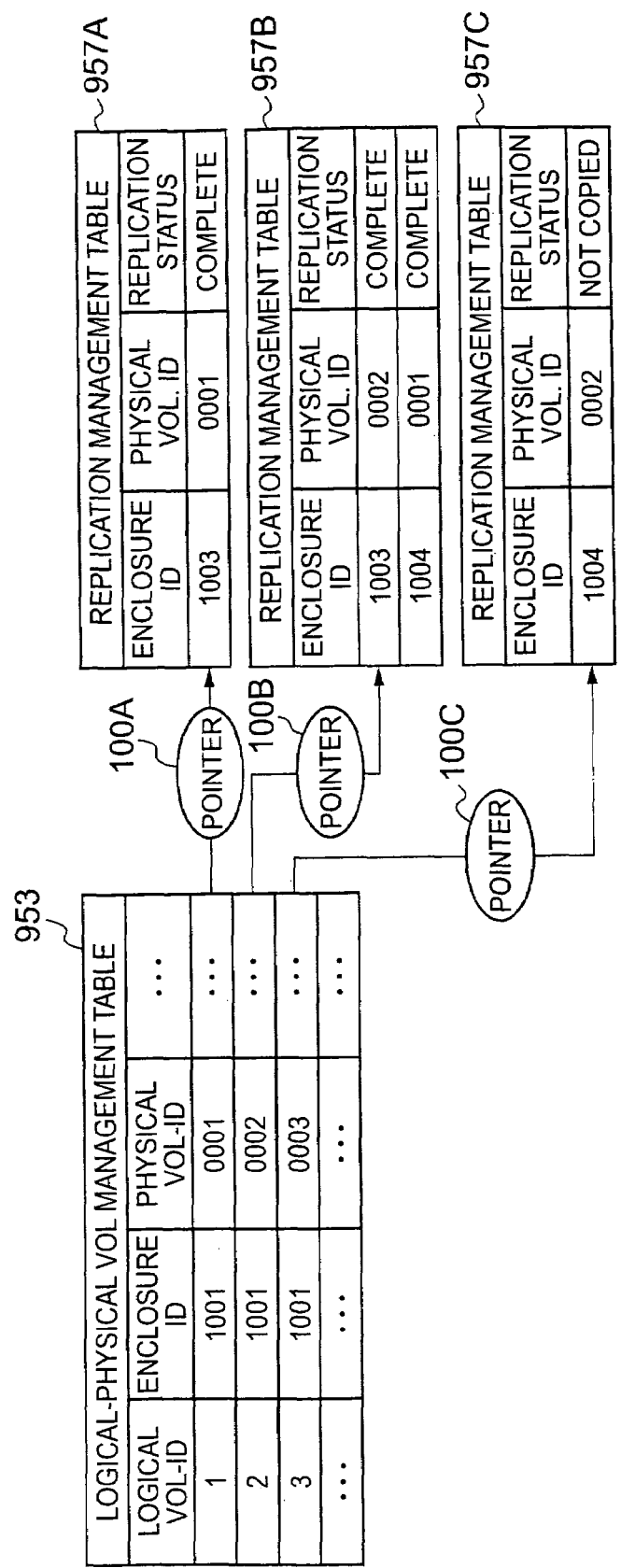
FIG. 9 shows the constitution of the logical physical VOL management table 953 and the replication management table 957 in a case where the replicate relationship shown in FIG. 8 exists.

FIG. 9 shows the constitution of the logical-physical VOL management table 953 and the replication management table 957 when the replicate relationship shown in FIG. 8 exists.

As shown in FIG. 9, the replication management table 957 is prepared for each physical VOL-ID (or logical VOL-ID) registered in the logical-physical VOL management table 953, for example, and pointers 100A to 100C indicate which physical VOL-ID corresponds with which replication management table 957. Recorded in each replication management table 957 are the enclosure ID of a storage control system in which a plurality of VOL exist, the physical VOL-ID of the replicate VOL and the replication status. The replication status is 'complete' if a replicate of the content archive 923 exists and is 'not copied' if this replicate does not exist, for example.

Due to the constitution of the logical-physical VOL management table 953 and the replication management table 957 illustrated in FIG. 9, the replication management program 957 read to the server control unit 951 is able to determine the following.

That is, the replication management program 957 is able to determine that the physical VOL-ID '0001' corresponding with the logical VOL-ID '1' and the enclosure ID '1001' is associated with a replication management program 957A via the pointer 100A. Further, the replication status registered in the replication management program 957A indicates 'complete'. Based on these facts, the replication management program 957 is able to determine that a replicate of the content archive 923 that exists in the physical VOL 935A (physical VOL-ID '0001') in the first storage control system 909 (enclosure ID '1001') exists in a replicate VOL 935B (physical VOL-ID '0001') of the second storage control system 909 (enclosure ID '1003').

Further, the replication management program 957 makes it possible to determine that the physical VOL-ID '0002' corresponding with the logical VOL-ID '2' and the enclosure ID '1001' is associated with the replication management program 957B via the pointer 100B. Further, the replication status registered in the replication management program 957B indicates 'complete'. Based on these facts, the replication management program 957 makes it possible to determine that the replicate of the content archive 923 that exists in the physical VOL 935C (physical VOL-ID '0002') in the first storage control system 909 exists in the replicate VOL 935D of the second storage control system 909 (the physical VOL-ID '0002') and the replicate VOL 935D (physical VOL-ID '0001') of the third storage control system 909 (enclosure ID '1004').

In addition, the replication management program 957 is able to determine that the physical VOL-ID '0001' corresponding with the logical VOL-ID '3' and the enclosure ID '1001' is associated with the replication management program 957C via the pointer 100C. Further, the replication status registered in the replication management program 957C indicates 'not copied'. Based on these facts, the replication management program 957 makes it possible to determine that the replicate of the content archive 923 that exists in a physical VOL 935E (physical VOL-ID '0003') in the first storage control system 909 does not exist in the replicate VOL 935F (physical VOL-ID '0002') of the third storage control system 909.

A case where the replicate of the content archive 923 that exists in the physical VOL 935A of the first storage control system 909 is generated in the replicate VOL 935B of the second storage control system 909 is taken as an example and the flow of the replicate process of the content archive 923 will be described with reference to FIG. 10 below.

When replicate processing is executed, the archive management server 905 (the replication management program 965, for example) seeks one or more blank physical VOL (a physical VOL in the 'Free' state, for example) by referring to the logical-physical VOL management table 953, and selects one or a plurality of blank physical VOL ('physical VOL 935B' here) from among the one or the plurality of blank physical VOL (that is, the replicate-destination physical VOL candidates) that are found. Further, as references for selecting a blank VOL, a variety of references can be adopted. For example, the blank physical VOL that is found first can be selected or the selection can be made by means of the same reference as in the case of the migration processing described subsequently.

Once a blank physical VOL 935B has been selected, the archive management server 905 prepares a new replication management table 957A that records information relating to the blank physical VOL 935 (physical VOL-ID and enclosure ID, and so forth) in the server storage device 947. Further, the archive management server 905 generates the pointer 100A that indicates the association between the replication management table 957A and the physical VOL-ID of the physical VOL 935A, and then registers information on the pointer 100A in the server storage device 947 (S31).

Next, the archive management server 905 issues a first logical path formation instruction, which serves to form a logical path between the replicate source physical VOL 935A and the LUN, to the first storage control system 909 by performing the same processing as in S5 above, for example, based on the physical VOL-ID and enclosure ID of the replicate source physical VOL 935A (S32).

Similarly, the archive management server 905 issues a second logical path formation instruction, which serves to form a logical path between the replicate destination physical VOL 935B and the LUN, to the second storage control system 909 by performing the same processing as in S5 above, for example, based on the physical VOL-ID and enclosure ID of the replicate destination physical VOL 935B (S33).

The first storage control system 909 forms a logical path 938A (S34) between the replicate source physical VOL 935A in the first storage control system 909 and the LUN by performing the same processing as in S6 to S7 above, for example, based on the first logical path formation instruction.

Likewise, the second storage control system 909 forms (S35) a logical path 938B between the replicate destination physical VOL 935B in the second storage control system 909 and the LUN by performing processing like the processing of S6 to S7 above, for example, based on the second logical path formation instruction.

A volume pair, which consists of the replicate source physical VOL 935A and the replicate destination physical VOL 935B, is formed by the processing of S31 to S35 (S36).

The archive management server 905 reports the details on the logical path 938B relating to the replicate destination physical VOL 935B (the port ID, target ID and LUN, for example) to the first storage control system 909 and instructs the first and second storage control systems 909 to generate the replicate of the content archive 923 in the replicate source physical VOL 935A in the replicate destination physical VOL 935B (S37). Accordingly, the replicate 923R of the content archive 923 in the replicate source physical VOL 935A is generated in the replicate destination physical VOL 935B. More specifically, for example, the first storage control system 909 generates the replicate 923R of the content archive 923 in the replicate source physical VOL 935A and transfers the replicate 923R to the replicate destination physical VOL 935B in the second storage control system 909 on the basis of the reported details on the logical path 938B. The second storage control system 909 stores the replicate 923R of the content archive that has been transferred to the replicate destination physical VOL 935B in accordance with the logical path 938B (S38).

The archive management server 905 updates the replication status of the newly prepared replication management table 957A from 'not copied' to 'complete' when the content archive replicate 923R is written in the replicate destination physical VOL 935B (S39).

Thereafter, the archive management server 905 issues an instruction to break the formed logical path (that is, the above break disconnect instruction) to the first and second storage control systems 909 (S40). Having received the disconnect instruction, the first storage control system 909 breaks the logical path 938A thus formed (S41). Similarly, the second storage control system 909 that has received the disconnect instruction breaks the logical path 938B thus formed (S42).

If, after this serial processing, the content archive 923 in the replicate source physical VOL 935A is damaged, the archive management server 905 judges, based on the logical-physical VOL management table 953, the pointer 100A and the replication management table 957A, in which physical VOL of which storage control system the replicate 923R of the content archive 923 exists, and is able to recover the damaged content archive 923 by acquiring the replicate 923R of the content archive from the physical VOL 935B thus determined.

(3) Process Performed in Migration Management.

Further, the processing performed in migration management will be described next.

Figure 11:
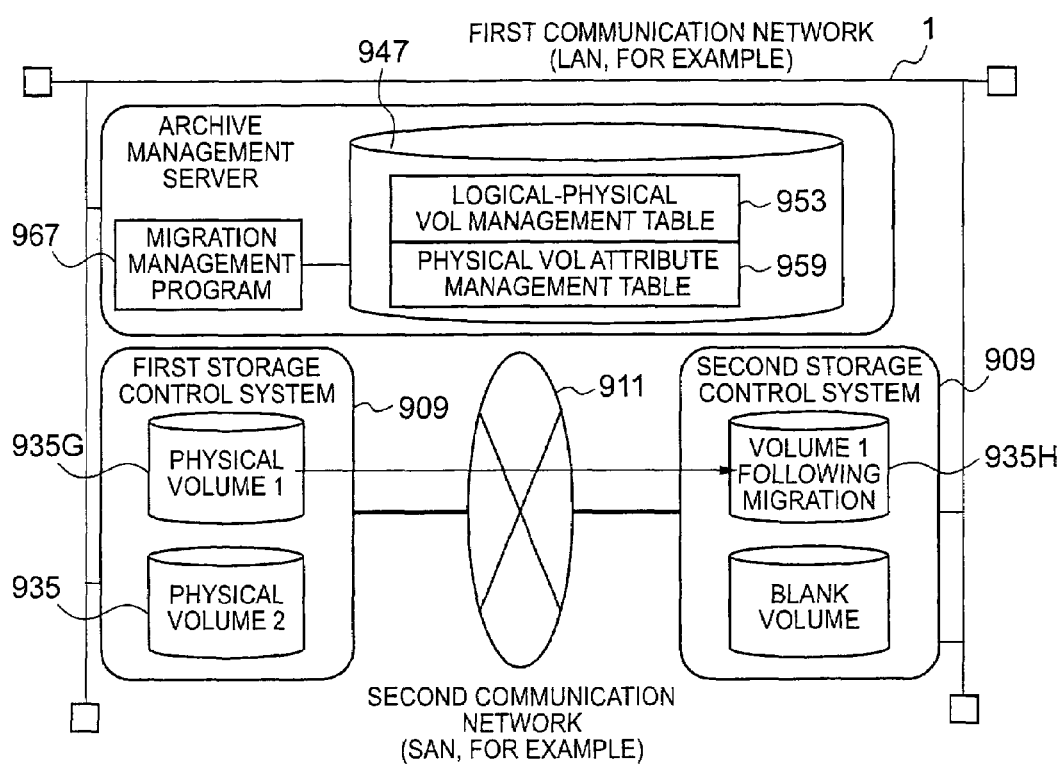
FIG. 11 shows an example of a concept relating to the migration management relating to this embodiment.

FIG. 11 shows an example of a concept relating to the migration management relating to this embodiment.

In the archive management system relating to this embodiment, the migration management program 967 that is read to the server control unit 951 of the archive management server 905 manages migration relationships such as with regard to which physical VOL 935 of which storage control system 909 the content archive 923 that exists in a particular physical VOL 935 in a particular storage control system 909 is moved to, based on the logical-physical VOL management table 953 and physical VOL attribute management table 959, and so forth, in the server storage device 947.

According to the example in FIG. 11, the migration of the content archive 923, which exists in a physical VOL 935G in the first storage control system 909, to the post-migration VOL (physical VOL) 935H of the second storage control system 909 is managed.

FIG. 12 shows an example of the constitution of the logical-physical VOL management table 953 and the physical VOL attribute management table 959 in a case where the migration relationship shown in FIG. 11 exists.

As shown in FIG. 12, the enclosure ID, physical VOL-ID and disk characteristics, for example, are recorded in the physical VOL attribute management table 959 as attribute information corresponding with the physical VOL for each physical VOL that exists in the storage control system pool 907. The disk characteristics represent one or more types of characteristic of the disk-type storage device 933 in which the physical VOL 935 exists, there being two types, which are 'high reliability/high performance' and 'low reliability/low performance', for example. 'High reliability' signifies a long average time interval until failure (MTBF (Mean Time Between Failure)), whereas 'low reliability' means that the MTBF is shorter than for high reliability, for example. On the other hand, 'high performance' means that the data write speed is high, whereas 'low performance' means that the data write speed is slower than that for high performance.

Each physical VOL-ID registered in the physical VOL attribute management table 959 is associated with one of a plurality of logical VOL-IDs (or physical VOL-IDs) that are registered in the logical-physical VOL management table 953 and the pointers 101A to 101C indicate which physical VOL-ID is associated with which physical VOL-ID.

The migration management program 959 read to the server control unit 951 is capable of executing the following management on the basis of the constitution of the logical-physical VOL management table 953 and the physical VOL attribute management table 959 illustrated in FIG. 12.

Figure 12A:
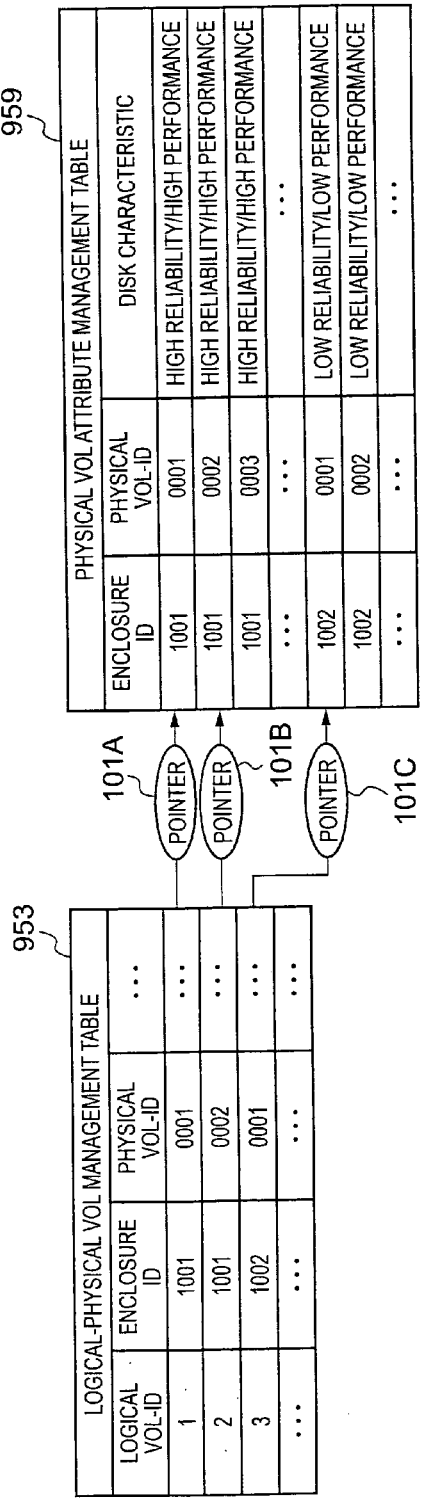
FIG. 12 shows an example of the constitution of the logical-physical VOL management table 953 and the physical VOL attribute management table 959 in a case where the migration relationship shown in FIG. 11 exists.

For example, as shown in FIG. 12(A), the migration management program 959 is able to determine that the logical VOL-ID '1' in the logical-physical VOL management table 953 is associated with the physical VOL-ID '0001' corresponding with the enclosure ID '1001' in the physical VOL attribute management table 959 via the pointer 101A.

In this case, the migration management program 959 performs the flowing processing when the content archive 923 in the physical VOL 935 with the logical VOL-ID '1', for example, is moved into the physical VOL 935 with the physical VOL-ID '0002' corresponding with the enclosure ID '1002'.

Figure 12B:
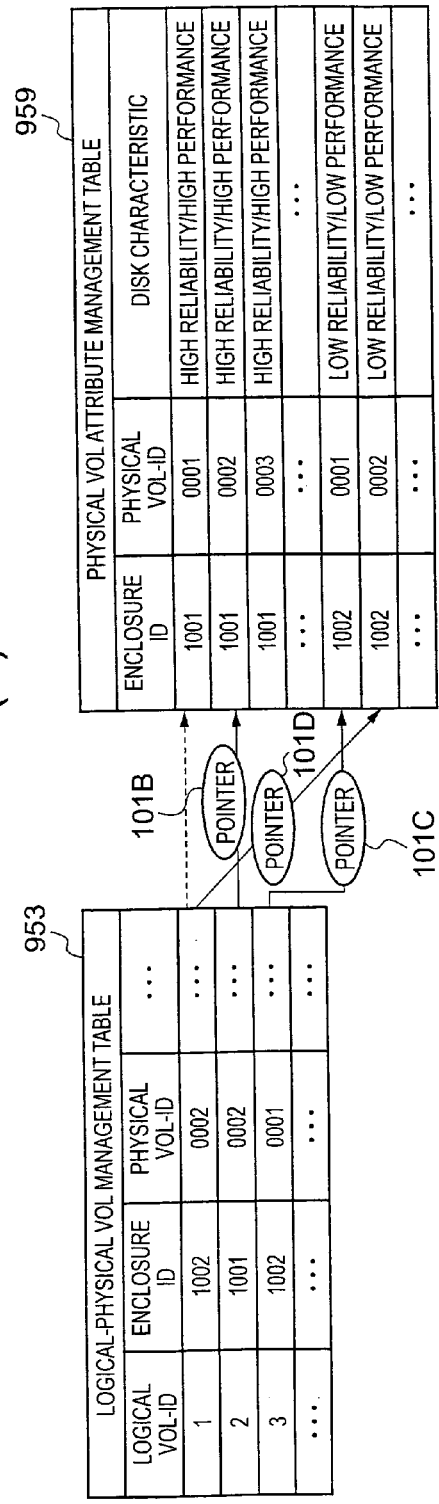

That is, as shown in FIG. 12(B), the migration management program 959 erases the pointer 101A. Next, the migration management program 959 generates a new pointer 101D that associates the logical VOL-ID '2' in the logical-physical VOL management table 953 and the physical VOL-ID '0002' corresponding with the enclosure ID '1002' in the physical VOL attribute management table 959, and registers this new pointer 101D in the server storage device 947. Further, the migration management program 959 updates the values of the enclosure ID and physical VOL-ID, which correspond with the logical VOL-ID '2' in the logical-physical VOL management table 953, to enclosure ID '1002' and physical VOL-ID '0002' respectively, which are associated by the new pointer 101D.

The migration management program 959 changes the constitution of the logical-physical VOL management table 953 and physical VOL attribute management table 959 as shown in FIGS. 12(A) to 12(B). Accordingly, it is possible to determine that the content archive 923 in the physical VOL with the logical VOL-ID '1' has moved from the high reliability/high performance physical VOL with the physical VOL-ID '0001' that corresponds with the enclosure ID '1001' to a low reliability/low performance physical VOL with the physical VOL-ID '0002' that corresponds with the enclosure ID '1002'.

FIG. 13 shows the flow of the migration processing of the content archive 923.

In a case where a predetermined event occurs (Y in S51), the archive management server 905 (the migration management program 965, for example) performs the processing of S52 and subsequent processing (described subsequently). Here, 'a case where a predetermined event occurs' is a case where a predetermined date and time has been reached, or a case where the disk-type storage device 933 is exchanged or expanded, for example. The processing of S51 can be executed at regular or irregular intervals.

The archive management server 905 checks (S52) whether the migration-target physical VOL exists in the storage control system pool 907 by referencing the logical-physical VOL management table 953. The archive management server 905 executes the processing of S54 and beyond in cases where the migration-target physical VOL exists (Y in S53). Here, physical VOL that may be considered for the physical VOL that is to become the migration-target physical VOL include, for example, a physical VOL whose storage deadline expires after a predetermined period (three days, for example), a physical VOL whose unused capacity is less than or more than a predetermined capacity (300 MB, for example), a physical VOL whose access frequency is lower than or higher than a predetermined frequency (50 times per minute, for example), or a physical VOL whose importance is higher than or lower than a predetermined reference ('medium' importance, for example) The storage deadline management program 963 read to the server control unit 951 is able to determine whether the storage deadline is close or distant.

When the migration-target physical VOL exists, the archive management server 905 seeks one or more blank physical VOL that possess the desired disk characteristic (a physical VOL with a 'Free' status, for example) based on the attribute of the migration-target physical VOL, and selects one or a plurality of blank physical VOL from among the one or the plurality of blank physical VOL thus found (in other words, migration-destination physical VOL candidates). Here, the 'desired disk characteristic' of a migration destination physical VOL candidate can, for example, be the 'high reliability/high performance' disk characteristic in cases where the attribute of the migration target physical VOL is, for example, that the storage deadline is beyond a predetermined period (180 days, for example), the unused capacity is larger than a predetermined capacity (20 GB, for example), the access frequency is higher than a predetermined frequency (fifty times per minute, for example), or the importance is above a predetermined reference ('medium' importance, for example). On the other hand, the above-mentioned 'desired disk characteristic' can, for example, be the 'low reliability/low performance' disk characteristic in cases where the attribute of the migration-target physical VOL is that the storage deadline is shorter than a predetermined period (3 days, for example), the unused capacity is smaller than a predetermined capacity (300 MB, for example), the access frequency is shorter than a predetermined frequency (50 times per minute, for example), or the importance is lower than a predetermined reference ('medium' importance, for example).

Once one or a plurality of blank physical VOL have been selected, the archive management server 905 generates a new pointer that associates information relating to the blank physical VOL (the physical VOL-ID and enclosure ID in the physical VOL attribute management table 959) and the logical VOL-ID in the logical-physical VOL management table 953, and registers the new pointer in the server storage device 947 (S54).

Next, by performing processing like that in S5 above, for example, the archive management server 905 issues (S55), to the first storage control system 909, a first logical path formation instruction that serves to form a logical path between the migration source physical VOL 935G and the LUN, based on the logical VOL-ID of the migration source physical VOL.

Similarly, by performing processing like that in S5 above, for example, the archive management server 905 issues, to the second storage control system 909, a second logical path formation instruction, which is for forming a logical path between a migration destination physical VOL 935H and the LUN, based on the physical VOL-ID and enclosure ID of the migration-destination physical VOL 935H (that is, the selected blank physical VOL) (S56).

By performing processing like the processing of S6 to S7 above, for example, the first storage control system 909 forms a logical path 938G between the migration source physical VOL 935G in the first storage control system 909 and the LUN, based on the first logical path formation instruction (S57).

Likewise, by performing processing like the processing of S6 to S7 above, for example, the second storage control system 909 also forms the logical path 938G between the migration destination physical VOL 935H in the second storage control system 909 and the LUN (S58).

The archive management server 905 reports the details on the logical path 938H relating to the migration destination physical VOL 935H (the port ID, target ID, and LUN, for example) to the first storage control system 909, and instructs the first and second storage control systems 909 to move the content archive 923 in the migration source physical VOL 935G to the migration destination physical VOL 935H (S59). As a result, the content archive 923 in the migration source physical VOL 935G is moved to the migration destination physical VOL 935H (S60). More specifically, for example, the first storage control system 909 reads the content archive 923 in the migration source physical VOL 935G, and transfers the content archive 923 to the migration destination physical VOL 935H in the second storage control system 909 based on the details of the reported logical path 938H. The second storage control system 909 stores the content archive 923, which has been thus transferred, to the migration destination physical VOL 935B in accordance with the logical path 938H. As a result, the content archive 923 that existed prior to migration is then removed from the migration source physical VOL 935G.

In cases where the content archive 923 is written in the migration destination physical VOL 935H, the archive management server 905 updates predetermined information items corresponding with the migration source logical VOL-ID in the logical-physical VOL management table 953 (S61). For example, the archive management server 905 changes the enclosure ID and physical VOL-ID corresponding with the migration source logical VOL-ID to the enclosure ID and physical VOL-ID corresponding with the migration-destination physical VOL 935H respectively. In addition, for example, the archive management server 905 changes the state corresponding with the migration source physical VOL 935G ('RW' or 'RO', for example) to another state ('Free' or 'RW', for example). Thereafter, the archive management server 905 issues an instruction to disconnect the logical path thus formed (that is, the above-mentioned disconnect instruction) to the first and second storage control systems 909 (S62). Having received the disconnect instruction, the first storage control system 909 disconnects the formed logical path 938G (S63), and, similarly, the second storage control system 909, which has received this disconnect instruction, disconnects the logical path 938H thus formed (S64).

In this process, the archive management server 905 may report the logical VOL-ID of the migration source that has become blank to the archive host 903 after S61, for example. In this case, the archive host 903 erases information in the logical VOL management table 927 that corresponds with the reported logical VOL-ID.

In addition, for example, the archive management server 905 may report the logical VOL-ID corresponding with the physical VOL-ID and enclosure ID of the migration destination physical VOL 935H, and the attribute of the content archive that has migrated to the physical VOL 935 H (the archive name, for example) to the archive host 903. In this case, the archive host 903 changes the archive name in the logical VOL management table 927 that corresponds with the reported logical VOL-ID to the reported archive name.

According to this embodiment, the archive management server 905 is able to display an operation GUI (Graphical User Interface) as described below, and control each storage control system 909 in the storage control system pool 907 on the basis of instructions received from the administrator via this operation GUI.

FIG. 14 shows an example of the constitution of an operation GUI that is displayed by the archive management server 905.

Figure 14A:
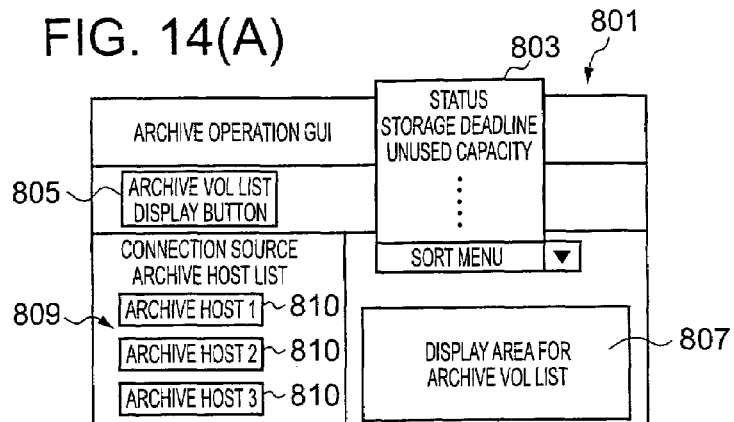
FIG. 14 shows an example of the constitution of an operation GUI that is displayed by the archive management server 905.

As shown in FIG. 14(A), the archive management server 905 displays an operation GUI 801. Provided in the operation GUI 801 are a connection source archive host list 809, an archive VOL list display button 805, an archive VOL list display area 807, and a sort menu 803.

The archive VOL list display button 805 is a tool for an instruction to display an archive VOL list.

The connection source archive host list 809 displays one or a plurality of archive host select buttons 810 that correspond with one or a plurality of archive hosts 903 that are provided in the archive management system of this embodiment. Each archive host select button 810 displays identifying information (the archive host name, for example) for the archive host 903 corresponding with the button 810.

The archive VOL list display area 807 displays a list of information relating to the archive VOL (that is, the physical VOL that are able to store the content archive 923), such as the details of the logical-physical VOL management table 953, for example.

The sort menu 803 displays one or a plurality of references for sorting the archive VOL list (the logical-physical VOL management table 953, for example). The one or plurality of references include, for example, the status ('RW', 'RO' or 'Free', for example), the storage deadline, or the unused capacity, or the like.

Screen transitions of the operation GUI 801 will be described below.

Figure 14B:
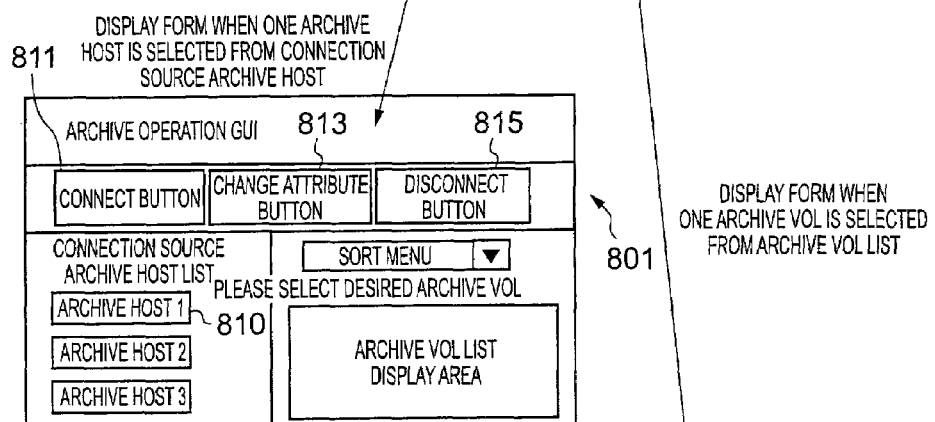

The archive management server 905 displays an archive VOL list (a logical-physical VOL management table 953, for example) on the archive VOL list display area 807 when the archive VOL list display button 805 is operated by using an inputting device such as a mouse, Further, when at least one archive host select button 901 is selected from one or a plurality of the archive host select buttons 901, the archive management server 905 switches the display content of the operation GUI 801 to display content such as that shown in FIG. 14(B).

For example, when the archive host select button 810 on which 'archive host 1' is written is selected, the archive management server 905 highlights this button 810 more than the other buttons 810 (changes the color of this button 810 or places a black border around same, for example). Further, the archive management server 905 allows the administrator to select the operation target physical VOL by means of a method for displaying a message such as 'Please select desired archive VOL'. In addition, the archive management server 905 displays a connect button 811, a change attribute button 813, and a disconnect button 815.

The connect button 811 is a tool that is operated when the archive host 903 selected by the administrator and the physical VOL selected by the administrator are logically connected.

The change attribute button 813 is a tool that is operated when changing an attribute relating to the physical VOL selected by the administrator (the status or storage capacity, or the like, for example).

The disconnect button 815 is a tool that is operated when breaking the logical connection between the archive host 903 selected by the administrator and the physical VOL selected by the administrator.

When the connect button 811 is operated, the archive management server 905 logically connects the archive host 903 selected by the administrator and the physical VOL selected by the administrator. More specifically, for example, the archive management server 905 forms a logical path between the physical VOL selected by the administrator and the LUN of the storage control system that comprises this physical VOL, and reports the details of the logical path to the archive host 903 selected by the administrator.

In addition, when the change attribute button 813 is operated, the archive management server 905 accepts a change of the attribute (the status or storage capacity, for example) relating to the physical VOL selected by the administrator. The archive management server 905 registers the details following the inputted change in the logical-physical VOL management table 953 and the like.

Furthermore, when the disconnect button 815 is operated, the archive management server 905 breaks the logical connection between the archive host 903 selected by the administrator and the physical VOL selected by the administrator. More specifically, for example, the archive management server 905 issues a disconnect instruction for disconnecting the logical path to the storage control system 909 that comprises the logical path formed between the LUN and the physical VOL.

Figure 14C:
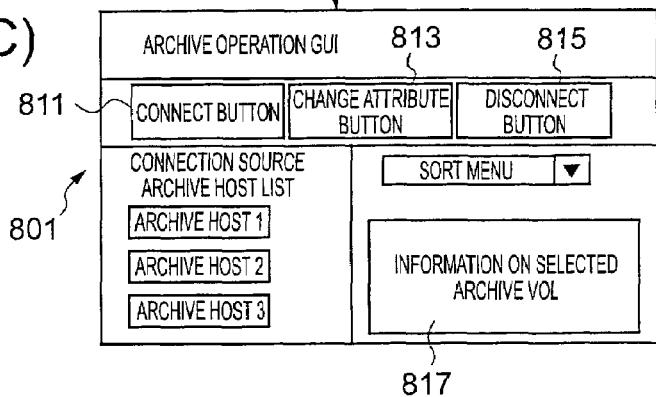

Further, when a physical VOL is selected by the administrator from the archive VOL list via the operation GUI 801 shown in FIG. 14(A), the archive management server 905 switches the display content of the operation GUI 801 to the display content shown in FIG. 14(C).

In other words, the archive management server 905 displays the information 817 relating to the selected physical VOL (the status or storage capacity, or the like, for example) in the above-mentioned display area 817. Further, the archive management server 905 displays the connect button 811, the change attribute button 813, and the disconnect button 815. The archive management server 905 is able to accept the selection of an archive host by the administrator via the operation GUI 801 shown in FIG. 14(C).

The archive management server 905 may receive the selection of a physical VOL and connect or disconnect the archive host and physical VOL after the archive host has been selected, or may receive the archive host selection and connect or disconnect the archive host and physical VOL after first receiving the physical VOL selection.

According to the embodiment above, the archive host 903, which is the read or write source of the content archive, is supplied with one or a plurality of storage control systems 909 as one storage control system pool 907, and is supplied with two or more physical VOL 935 contained in one or a plurality of storage control systems 909 as a plurality of physical VOL 935 contained in one storage control system pool 907. More specifically, a plurality of logical VOL-IDs, which have been allocated to a plurality of physical VOL 935 present in the storage control system pool 907, are supplied to the archive host 903. The archive management server 905 manages information such as which logical VOL-ID corresponds with which physical VOL-ID of a particular storage control system. Therefore, simply as a result of the archive host 903 specifying the desired logical VOL-ID to the archive management server 905, the storage control system that comprises the physical VOL 935 corresponding with the logical VOL-ID, and the physical VOL-ID are found from the storage control system pool 907 by the archive management server 905, and the physical VOL 935 in the storage control system 909 thus found can be accessed. Accordingly, the complications involved in registering the physical constitution of the storage control system pool 907 (what kind of storage control system exists and what kind of physical VOL constitution is present in each storage control system 909, and so forth, for example) for each of the one or the plurality of archive hosts 903 no longer exist.

Further, according to the above constitution, the content archive that exists in the physical VOL in a certain disk-type storage device is replicated in the physical VOL of another disk-type storage device 933 (or, in addition, in another storage control system 909). Accordingly, even when a content archive is damaged as a result of damage to this certain disk-type storage device, and so forth, the content archive can be recovered by using the replicate of the content archive generated in the physical VOL in the other disk-type storage device 933.

Further, according to the embodiment above, when a migration target physical VOL is present, the content archive in the disk-type storage device 933 that comprises this migration target physical VOL is moved into a physical VOL in another disk-type storage device that has specific disk characteristics based on the attribute of the migration target physical VOL. As a result, a content archive can be managed in a suitable location based on the physical VOL attribute.

Furthermore, according to the above embodiment, the content archives 923 can be managed in physical VOL units for storing content archives rather than in content archive units.

Further, several modified examples of the above embodiments may be considered. Each modified example will be described herein below.

(1) FIRST MODIFIED EXAMPLE

The first modified example relates to the storage deadline of the content archive.

FIG. 15 shows an example of the flow of processing for setting a storage deadline.

Suppose that, in the first modified example, the content archive host 903 is a CIM (Common Information Model) client and the archive management server 905 is a CIM server. Suppose also that the archive management server 905 is a CIM server such as a CIMON (CIM Object Manager), for example. Suppose also that the storage deadline of the digital archive that is stored in the physical VOL 935 corresponding with the physical VOL ID can be set for each physical VOL-ID in the physical VOL management table 941 of the storage control system 909.

The content archive host 903 generates the storage deadline for the content archive, which is the storage target, and a message detailing the logical VOL-ID corresponding with the storage destination physical VOL 935 (S61). The message generated here identifies management target elements, as in 'Class=volume', for example, and an attribute that is set for the management target element (logical VOL, for example) (the logical VOL ID is detailed along with the storage deadline in the format 'Time- . . . ', for example). This message has a logical format and does not depend on the physical constitution of the storage control system. The content archive host 903 communicates the generated message to the archive management server 905 (S62). Further, at least one of the communicated storage deadline and logical VOL-ID may be designated by the user or may be determined automatically on the basis of the archive attribute of the content archive 923.

The archive management server 905 analyzes the message thus received and obtains the logical VOL-ID and storage deadline through this analysis. The archive management server 905 then references the logical-physical VOL management table 953 and sets the storage deadline thus obtained in the setting field of the storage deadline corresponding with the logical VOL-ID thus obtained (S63).

Further, the archive management server 905 extracts the enclosure ID and physical VOL-ID corresponding with the logical VOL-ID thus obtained from the logical-physical VOL management table 953 (S64). The archive management server 905 then communicates the storage deadline and physical VOL-ID obtained in S63 to the storage control system 909 corresponding with the extracted enclosure ID and issues an instruction to set the storage deadline (S65).

The storage control system 909 receives the instruction to set the storage deadline from the archive management server 905 and, in response to this instruction, sets the storage deadline thus communicated in the storage deadline setting field in the physical VOL management table 941 that corresponds with the physical VOL-ID that was communicated by the archive management server 905 (S66).

Further, the storage deadline can be expressed as a period of a number of days, for example, or can be expressed as an expiry point (referred to simply as a 'deadline' herein below) in the form of a birth date, for example. Further, at least one of the archive management server 905 and storage control system 909 can control the timing for executing the storage deadline expiry action on the basis of whether the set storage deadline is a duration or deadline. A specific example of such control will be described below.

Figure 16A:
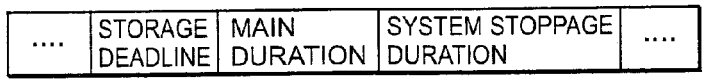
FIG. 16A shows an example of one record in the table of a first modified example of the first embodiment of the present invention.

FIG. 16A shows an example of one record in table 953 or 941 of a first modified example of the first embodiment of the present invention.

In this first embodiment example, the main duration and system stoppage duration are sometimes registered in addition to the storage deadline for each physical VOL-ID, for example, in the logical-physical VOL management table 953 or physical VOL management table 941 in which the storage deadline is set. The main duration and system stoppage duration exert an influence in cases where the set storage deadline is a period. The main duration of a certain physical VOL expresses the duration from the start of the count for the storage deadline of the physical VOL until the current time irrespective of the system stoppage duration. The system stoppage duration of a certain physical VOL expresses the accumulation of durations over which the storage control system 909 comprising the physical VOL is stopped (durations while the power is in an OFF state, for example).

Figure 16B:
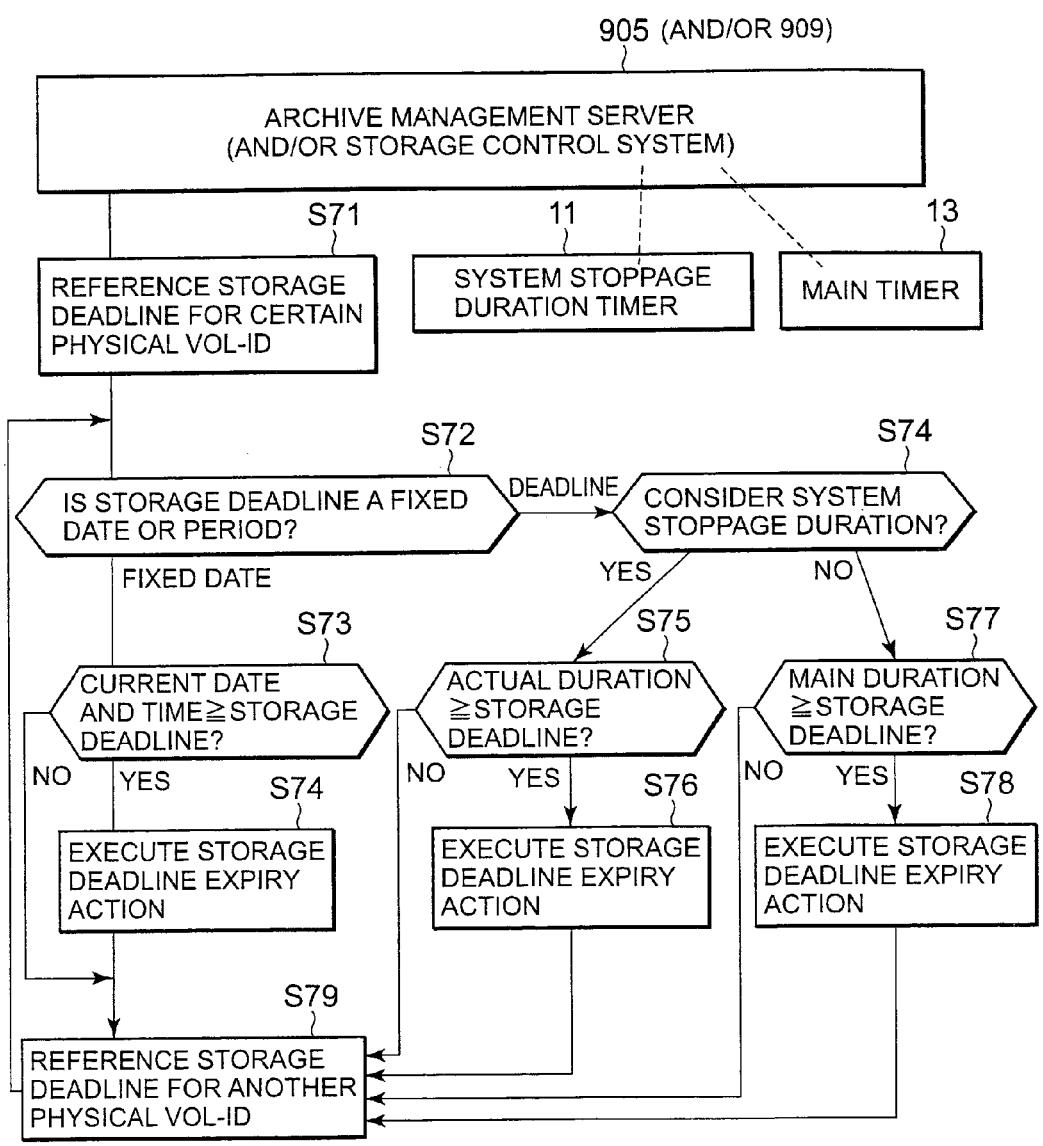
FIG. 16B shows an example of the flow of the storage deadline management processing that is executed according to the first modified example of the first embodiment of the present invention.

FIG. 16B shows an example of the flow of the storage deadline management processing that is executed by the first modified example of the first embodiment of the present invention.

At least one of the archive management server 905 and storage control system 909 comprises a system stoppage duration timer 11 that measures the system stoppage duration, and a main timer 13 that measures the main duration. When the storage control system 909 comprises the system stoppage duration timer 11, the storage control system 909 is able to communicate the measured system stoppage duration to the archive management server 905. That is, in the case of the archive management system according to the first modified example, whether or not the system stoppage duration timer 11, main timer 13, and so forth are provided in either one or both of the archive management server 905 and storage control system 909, both the archive management server 905 and the storage control system 909 are then able to obtain the main duration and the system stoppage duration, and so forth, for each of the respective physical VOL-ID and the main duration and system stoppage duration and so forth thus obtained can then be set in table 953 or 941.

The archive management server 905 (and/or storage control system 909) accesses the logical-physical VOL management table 953 (and/or physical VOL management table 941), references the storage deadline for a certain physical VOL-ID that has been written in the access destination table 953 (S71), and checks whether the storage deadline thus referenced is expressed as a duration or as a deadline (S72).

When the result of the check in S72 is that the storage deadline is expressed as a deadline (expressed as a date, for example), the archive management server 905 compares the storage deadline thus referenced with the current date and time (S73). As a result, when the current date and time matches or exceeds the storage deadline (Y in S73), the archive management server 905 executes the storage deadline expiry action (deletes the content archive in the physical VOL that corresponds with the certain physical VOL-ID, for example) (S74). Thereafter, the archive management server 905 references the storage deadline for another physical VOL-ID and repeats the processing of S72 and subsequent steps.

When the result of the check in S72 is that the storage deadline is expressed as a period (is expressed as a number of days, for example), the archive management server 905 judges whether the system stoppage duration is to be considered (S74) Where the results of the judgment are concerned, settings are made for each content archive or for each physical VOL, for example, to determine whether to consider the system stoppage duration (in other words, whether the storage deadline is the actual duration or main duration described subsequently) such that the results can be outputted in accordance with the content of these settings and may be outputted on the basis of judgment policy data (not shown) in which it is detailed whether to consider the system stoppage duration in the case of a certain kind of content archive or a certain kind of physical VOL (whether to consider the system stoppage duration in the case of a certain kind of data size, for example).

When the result of the judgment in S74 is that the system stoppage duration is considered, the archive management server 905 calculates the actual duration by subtracting the system stoppage duration from the main duration corresponding with the certain physical VOL-ID and then compares the actual duration thus calculated with the storage deadline (S75). As a result, when the actual duration matches or exceeds the storage deadline (Y in S75), the archive management server 905 executes the storage deadline expiry action (S76). Thereafter, the archive management server 905 references the storage deadline for another physical VOL-ID and repeats the processing of S72 and subsequent steps.

When the result of the judgment of S74 is that the system stoppage duration is not considered, the archive management server 905 compares the main duration corresponding with the certain physical VOL-ID with the storage deadline (S77). When, as a result, the main duration matches or exceeds the storage deadline (Y in S77), the archive management server 905 executes the storage deadline expiry action (S78). Thereafter, the archive management server 905 references the storage deadline of another physical VOL-ID and repeats the processing of step S72 and subsequent steps.

The storage control system 909 is also able to execute processing that is similar to the serial processing above by referencing the physical VOL management table 941.

Further, in the case of the first modified example, when the storage deadline of a certain physical VOL 935 is expressed as a period and the storage deadline is managed as an actual duration, the archive management server 905 or storage control system 909 is able to extend the storage deadline of the content archive in the certain physical VOL 935 by the duration over which the storage control system 909 is stopped if such a duration exists. More specifically, when the storage deadline '300 days', for example, has been set, of which the main duration is '300 days' and the system stoppage duration is '2 days' (that is, the actual duration is '298 days'), if the storage deadline is managed as the main duration, data erasure processing is executed in accordance with the storage deadline '300 days'. However, if the storage deadline is managed as the actual duration, because the system stoppage duration is '2 days', the time at which is the data erasure processing is performed is extended by 2 days.

(2) SECOND MODIFIED EXAMPLE

The second modified example relates to the erasure of the content archive. At least one of the archive management server 905 and the storage control system 909 is able to select a data erasure method from among data erasure methods of a plurality of types and perform data erasure processing in accordance with the data erasure method thus selected. The data erasure methods of the plurality of types include the following methods (A) to (C), for example:

(A) a method that uses a data deletion execution program (not shown) of the storage control system;

(B) a method that writes data that is constituted by a predetermined data pattern or a data pattern (generically termed an 'erasure pattern' herein below) that is selected from among data patterns of two or more types (null data or random data, or the like, for example) to a physical VOL; and (C) a method that executes one or two or more data erasure processes according to method (B). The selection of a data erasure method may be executed automatically in accordance with erasure rules (described subsequently) or may be performed at an optional time chosen by the user, for example.

When method (A) is adopted, the read/write control program 961 of the archive management server 905 is able to delete all the data in the physical VOL constituting the data erasure processing target (or the content archive constituting the erasure target) by calling the data deletion execution program of the storage control system 909, for example.

When method (B) is adopted, the archive management server 905 or storage control system 909 is able to write data that is constituted by an erasure pattern ('erasure pattern data' hereinafter) to the physical VOL constituting the data erasure processing target, for example. Alternatively, the archive management server 905 sends information on the path to the physical VOL constituting the data erasure processing target and a data erasure command to the content archive host 903 and, in response to the received data erasure command, the content archive host 903 is able to delete the data in the physical VOL by sending erasure pattern data and a write command to the physical VOL constituting the data erasure processing target in accordance with the received path information.

When method (C) is adopted, the archive management server 905 or storage control system 909 is able to execute processing to write null pattern data once to the whole of the physical VOL constituting the data erasure target (that is, format processing), or can execute processing to write random pattern data a plurality of times (seven, for example) to the whole of the physical VOL constituting the data erasure processing target, for example.

Further, it can be determined which kind of data pattern to select from among data patterns of two or more types and how many times to execute data erasure processing, and so forth, on the basis of the attribute of the physical VOL or content archive constituting the data erasure target, for example.

Figure 17:
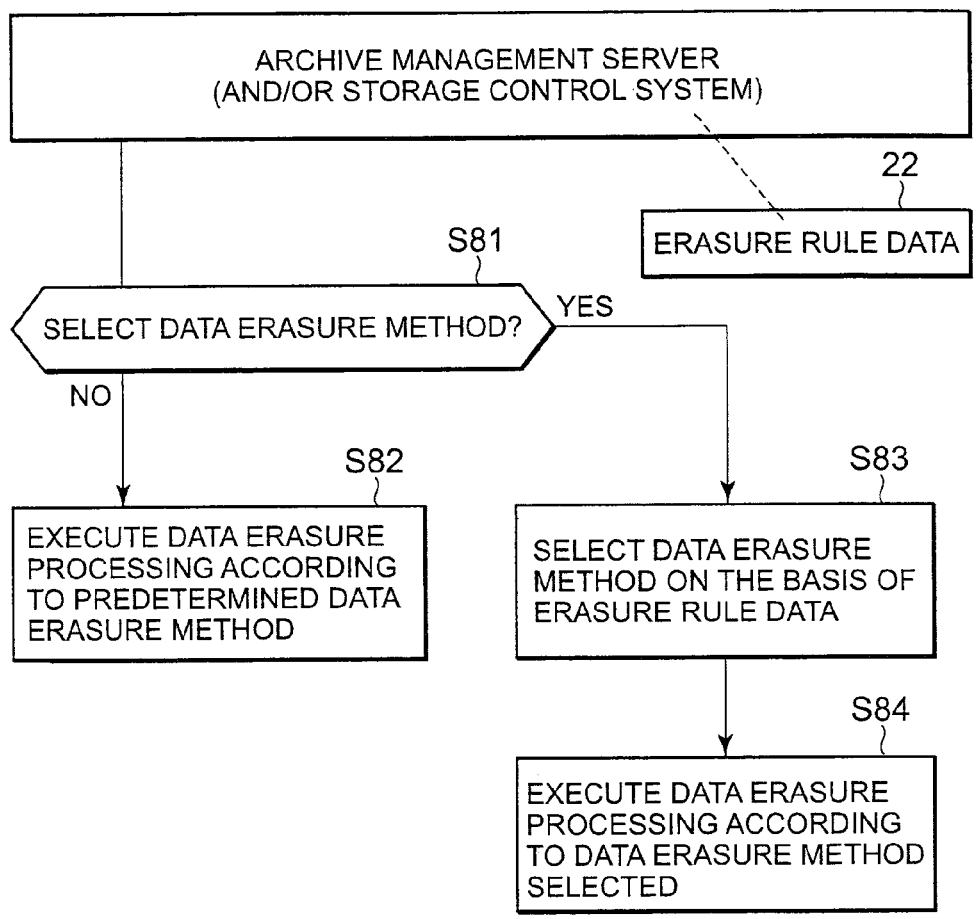
FIG. 17 shows an example of the flow of processing to execute data erasure processing that is executed according to a second modified example of the first embodiment of the present invention.

FIG. 17 shows an example of the flow of processing to execute data erasure processing.

The archive management server 905 (and/or storage control system 909) holds erasure rule data 22, for example. The erasure rule data 22 details an erasure rule that indicates that data erasure processing according to a certain kind of data erasure method is to executed when data erasure processing is performed on a content archive or physical VOL with a particular attribute.

The archive management server 905 (and/or storage control system 909) judges whether to perform processing to select the data erasure method (S81).

If it is judged in S81 that this processing is not to be performed (N in S81), the archive management server 905 executes data erasure processing according to a predetermined data erasure method (S82).

On the other hand, if it is judged that processing to select the data erasure method is to be performed (Y in S81), the archive management server 905 selects the data erasure method from among the data erasure methods of a plurality of types in accordance with the content of the erasure rule data (S83) and executes data erasure processing according to the data erasure method thus selected (S84).

(3) THIRD MODIFIED EXAMPLE

The third modified example relates to the replication or migration of the content archive. More specifically, according to the third modified example, attribute information ('RO' state or other states, for example), which relates to the replicate source physical VOL or the migration source physical VOL of the content archive, can be associated with the replicate destination physical VOL or migration destination physical VOL. A specific example will be described below.

FIG. 18 shows an example of the processing to associate attribute information of a replicate source physical VOL of the content archive with a replicate destination physical VOL.

Figure 10:
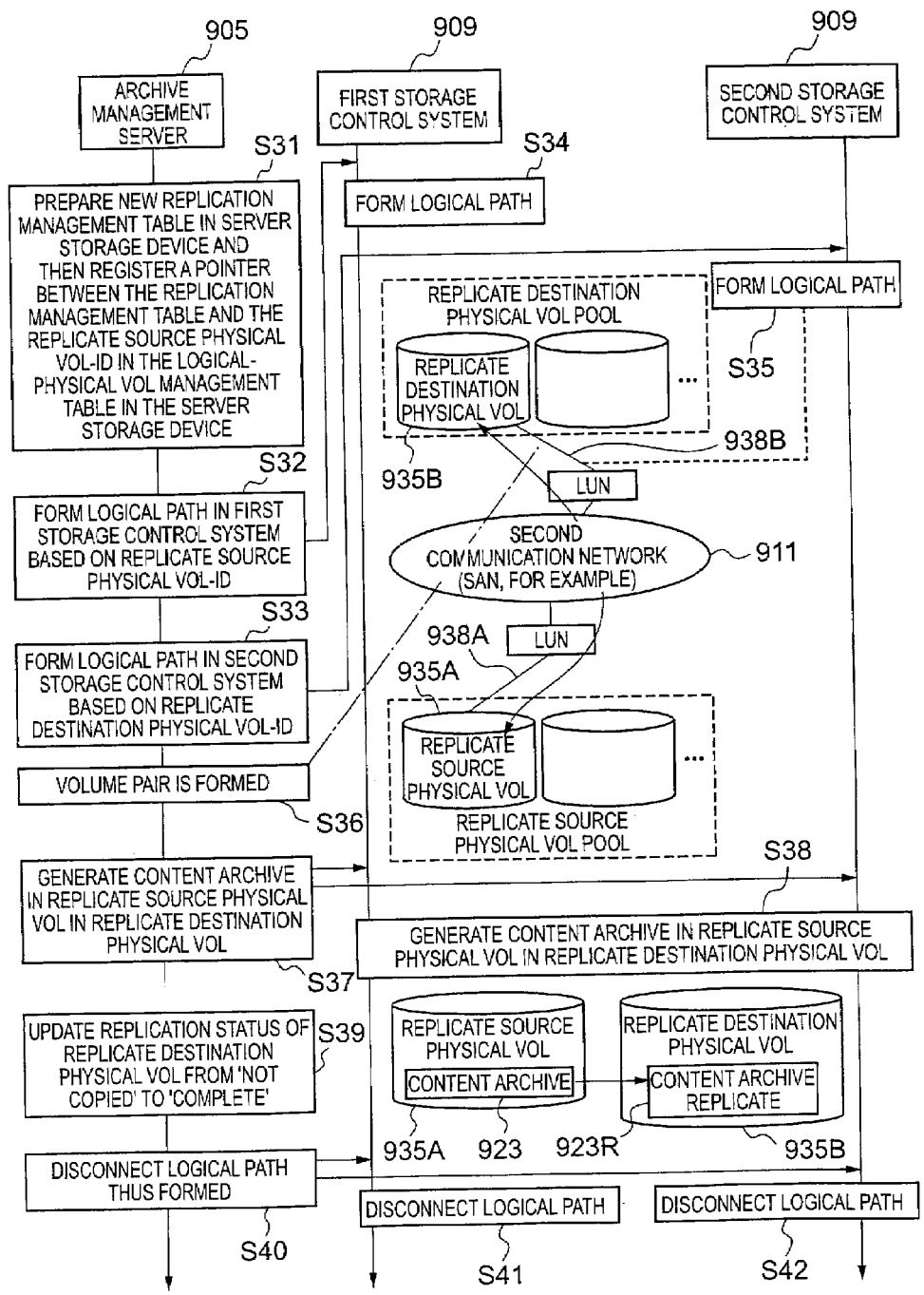
FIG. 10 shows the flow of the replicate processing of the content archive 923.

The archive management server 905 or first storage control system (a storage control system that comprises the replicate source physical VOL 935A) 909 extracts attribute information corresponding with the physical VOL-ID of the replicate source physical VOL 935A from the logical-physical VOL management table 953 or physical VOL management table 941 after S37 and S38 in FIG. 10 and then sends the extracted attribute information to the second storage control system (storage control system comprising the replicate destination physical VOL 935B) 909 (S38-1), for example. The attribute information is information that includes at least one of the state of the physical VOL ('RO', for example), the storage deadline, the main duration and the system stoppage duration, for example.

The second storage control system 909 associates the received attribute information with the replicate destination physical VOL 935B (S38-2). More specifically, the second storage control system 909 writes the received attribute information to a field in its own physical VOL management table 941, this field corresponding with the physical VOL-ID of the replicate destination physical VOL 935B.

Thereafter, the processing of step S39 and subsequent steps in FIG. 10 is executed.

As a result of the above processing of S38-1 and S38-2, the state and storage deadline, and so forth, of the replicate destination physical VOL 935B can be rendered the same as those of the replicate source physical VOL 935A.

FIG. 19 shows an example of processing to associate attribute information of the migration source physical VOL of the content archive with the migration destination physical VOL.

The archive management server 905 or first storage control system 909 extracts attribute information corresponding with the physical VOL-ID of the migration source physical VOL 935G from the logical-physical VOL management table 953 or physical VOL management table 941 following S59 and S60 in FIG. 13 and sends the attribute information thus extracted to the second storage control system 909, for example (S60-1). The second storage control system 909 then associates the received attribute information with the migration destination physical VOL 935H (S60-2).

The archive management server 905 or first storage control system 909 deletes attribute information corresponding with the physical VOL-ID of the migration source physical VOL 935G from the logical-physical VOL management table 953 or physical VOL management table 941 (or sets 'Free' for this state, for example) and performs data erasure processing on the migration source physical VOL 935G according to a certain data erasure method (S61').

Thereafter, the processing of S62 and subsequent steps in FIG. 13 is performed.

As a result of the processing of S60-1 and S60-2 above, the state, storage deadline, and so forth of the migration destination physical VOL 935H can be rendered the same as those of the migration source physical VOL 935G. Further, as a result of the processing of S61', the migration source physical VOL 935G can be rendered a blank physical VOL.

Although an embodiment of the present invention was described above, this embodiment merely serves to illustrate the description of the present invention and is not intended to limit the scope of the present invention to this embodiment alone. The present invention can be implemented by a variety of other embodiments.

For example, the replicate destination physical VOL and migration destination physical VOL are not completely blank physical VOL in which no content archive is registered. Unused storage capacity, which permits storage of a content archive replicate or a migration target content archive, for example, may be present.

Further, a logical path between the LUN and physical VOL may be prepared beforehand within each storage control system 909, for example.

Further, highly reliable and/or high-performance disk-type storage devices include a disk-type storage device comprising a Fibre Channel ('FC' hereinafter) interface that has undergone standardization according to ANSI T11, for example. Further, low-reliability and/or low performance disk-type storage devices include a disk-type storage device that comprises an ATA (ATAttachment) interface that has undergone standardization according to ANSI T13 (more specifically, a serial ATA disk-type storage device), for example), for example.

Further, the storage deadline that is set for at least one of the archive management server 905 and storage control system 909 is not limited to a storage deadline that is communicated by the content archive host 903 but may instead be a storage deadline that is set automatically on the basis of the attributes of a digital archive, for example.

Further, one content archive may be saved in one physical VOL 935 or a plurality of content archives may be saved therein. When a plurality of content archives are saved in one physical VOL 935, one storage deadline (the most remote storage deadline expiration among the plurality of content archives, for example) may be set for one physical VOL 935 or may be set for each content archive. When a storage deadline is set for each content archive, for example, each storage deadline may also be associated with the content archive ID (name, for example) or may be associated with the range of logical block addresses in which the content archive is stored.

The present invention is able to improve the convenience of digital archive storage.

What is claimed is:

1. A server coupled to both an archive host that outputs a digital archive and to a plurality of storage control systems that include disk-type storage devices in which the digital archive is stored, wherein the server being interfaceable with:

a plurality of physical volumes constituting storage regions for storing the digital archive, provided in two or more of the disk-type storage devices of the plurality of storage control systems;

one or more physical IDs, each of which is allocated to one or more physical volumes of the plurality of physical volumes of the storage control systems, and which are managed by the individual storage control systems; and a plurality of logical IDs, each of which is allocated to each of the plurality of physical volumes, and which are managed by the archive host;

wherein the server comprises:

a volume management storage region that stores a logical ID, a physical ID, and a control system ID of a storage control system that includes the physical volume, for each of the plurality of physical volumes;

extraction means, which, when the designation of a logical ID selected from among the plurality of logical IDs is received from the archive host, extracts the physical ID and control system ID that correspond with the received logical ID, from the volume management storage region;

access path reporting means for reporting, to the archive host, access path information for accessing the physical volume with the physical ID, this access path information being based on the physical ID and control system ID thus extracted;

storage deadline setting means for setting, in the volume management storage region, an archive storage deadline that is expressed as a period for a certain physical volume on which the digital archive is stored;

first duration detection means for detecting a first duration, which is a duration from a time the digital archive is saved in the certain physical volume until a current time;

second duration detection means for detecting a second duration, which is a duration over which the storage control system including the certain physical volume is stopped;

third duration calculation means for calculating a third duration, which is a difference between the first duration and the second duration; and erasure means for comparing the third duration thus calculated with the period expressed by the archive storage deadline set for the certain physical volume, judging whether the third duration is equal to or more than the period and, when a judgment result is affirmative, erasing the digital archive in the certain physical volume.

2. The server according to claim 1, wherein the storage deadline setting means sets, in the volume management storage region, an archive storage deadline that is expressed in a format that is selected by the user from a period and a deadline; and, if the archive storage deadline is expressed in a deadline format, the erasure means compares a current date and time with the deadline expressed by the archive storage deadline, judges whether the current date and time is at or beyond the archive storage deadline and, when the judgment result is affirmative, erases the digital archive in the certain physical volume, whereas, if the archive storage deadline is expressed in a period format, the erasure means compares the third duration and the period.

3. The server according to claim 1, comprising:

erasure method selection means for selecting a data erasure method from among data erasure methods of a plurality of types; and erasure implementation means for erasing the digital archive in the physical volume according to the data erasure method thus selected.

4. The server according to claim 1, wherein each of the plurality of storage control systems manages volume attribute information for each of two or more physical volumes that each of the plurality of storage control systems includes, and the volume management storage region stores volume attribute information for each of the plurality of physical volumes, wherein the server comprising:

archive generation means for controlling at least one of a first storage control system that includes a first physical volume and a second storage control system that includes a second physical volume to generate the digital archive in the first physical volume and in the second physical volume; and volume attribute information transmission means for transmitting volume attribute information corresponding with the first physical volume to the second storage control system.

5. The server according to claim 4, wherein the archive generation means shifts the digital archive in the first physical volume to the second physical volume, the server comprising:

attribute information deletion means, which, when the digital archive is shifted from the first physical volume to the second physical volume, deletes the volume attribute information corresponding with the first physical volume from the volume management storage region or the first storage control system.

6. A storage system that comprises a plurality of storage control systems that comprise disk-type storage devices in which a digital archive is stored, and a server connected to an archive host that outputs the digital archive and to the plurality of storage control systems, wherein the server being interfaceable with:

a plurality of physical volumes constituting storage regions for storing a digital archive provided in two or more of the disk-type storage devices of the plurality of storage control systems;

one or more physical IDs, each of which is allocated to one or more physical volumes of the plurality of physical volumes of the storage control systems, and which are managed by the individual storage control systems; and a plurality of logical IDs, each of which is allocated to each of the plurality of physical volumes, and which are managed by the archive host;

wherein the server comprises:

a volume management storage region that stores a logical ID, a physical ID, and a control system ID of a storage control system that includes the physical volume, for each of the plurality of physical volumes;

extraction means, which, when the designation of a logical ID selected from among the plurality of logical IDs is received from the archive host, extracts the physical ID and control system ID that correspond with the received logical ID from the volume management storage region; and access path reporting means for reporting, to the archive host, access path information for accessing the physical volume with the physical ID, the access path information being based on the physical ID and control system ID thus extracted; and wherein:

the storage control system comprises:

means for receiving a write command or read command based on the reported access path information from the archive host;

first storage control means that, when the write command is received, stores the digital archive in a physical volume that has the physical ID specified by the access path information; and second storage control means that, when the read command is received, reads the digital archive from the physical volume that has the physical ID specified by the access path information and sends the digital archive to the archive host;

wherein at least one of the server and the storage control system comprise:

storage deadline setting means for setting an archive storage deadline that is expressed as a period for a certain physical volume on which the digital archive is stored;

first duration detection means for detecting a first duration, which is a duration from a time the digital archive is saved in the certain physical volume until a current time;

second duration detection means for detecting a second duration, which is a duration over which the storage control system including the certain physical volume is stopped;

third duration calculation means for calculating a third duration, which is a difference between the first duration and the second duration; and erasure means for comparing the third duration thus calculated with the period expressed by the archive storage deadline set for the certain physical volume, judging whether the third duration is equal to or more than the period and, when a judgment result is affirmative, erasing the digital archive in the certain physical volume.

7. The storage system according to claim 6, wherein at least one of the server and the storage control system comprise:
erasure method selection means for selecting a data erasure method from among data erasure methods of a plurality of types; and
erasure implementation means for erasing the digital archive in the physical volume according to the data erasure method thus selected.

8. The storage system according to claim 6, wherein each of the plurality of storage control systems manages volume attribute information for each of two or more physical volumes of the plurality of storage control systems, and
the volume management storage region stores volume attribute information for each of the plurality of physical volumes;
wherein the server comprises archive generation means for controlling at least one of a first storage control system that includes a first physical volume, and a second storage control system that includes a second physical volume to generate the digital archive in the first physical volume in the second physical volume; and
wherein at least one of the server and the first storage control system comprise:
volume attribute information transmission means for acquiring volume attribute information corresponding with the first physical volume from the volume management storage region or the first storage control system, and then transmitting the acquired volume attribute information to the second storage control system; and
wherein the second storage control system comprises means for setting received volume attribute information for the second physical volume.

9. A method, controlling interfacing between: a server; a plurality of physical volumes constituting data storage regions provided in two or more disk-type storage devices that a plurality of storage control systems include; one or more physical IDs, each of which is allocated to one or more physical volumes of the plurality of physical volumes of the storage control systems, and which are managed by the individual storage control systems; and a plurality of logical IDs, each of which is allocated to each of the plurality of physical volumes, and which are managed by an archive host that outputs a digital archive, the method comprising:
the archive host sending a logical ID selected from among the plurality of logical IDs to the server;
the server extracting a physical ID and control system ID corresponding with the logical ID received from the archive host from a volume management storage region that stores, for each of the plurality of physical volumes, the logical ID, the physical ID, and the control system ID of the storage control system that includes the physical volume;
the server reporting access path information for accessing the physical volume with the physical ID to the archive host, the access path information being based on the extracted physical ID and control system ID;
the archive host sending a write command or read command based on the reported access path information to the storage control system;
when the write command is received, the storage control system storing a digital archive that contains the write command in the physical volume with the physical ID specified by the access path information; and
when the read command is received, the storage control system reading a digital archive from the physical volume with the physical ID specified by the access path information and sending the digital archive to the archive host;
setting, in the volume management storage region, an archive storage deadline that is expressed as a period for a certain physical volume on which the digital archive is stored;
detecting a first duration, which is a duration from a time the digital archive is saved in the certain physical volume until a current time;
detecting a second duration, which is a duration over which the storage control system including the certain physical volume is stopped;
calculating a third duration, which is a difference between the first duration and the second duration; and
comparing the third duration thus calculated with the period expressed by the archive storage deadline set for the certain physical volume, judging whether the third duration is equal to or more than the period and, when a judgment result is affirmative, erasing the digital archive in the certain physical volume.

10. The method according to claim 9, wherein the deadline setting sets, in the volume management storage region, an archive storage deadline that is expressed in a format that is selected by a user from a period and a deadline; and,
if the archive storage deadline is expressed in deadline format, comparing a current date and time with the deadline expressed by the archive storage deadline, judging whether the current date and time is at or beyond the deadline and, when a judgment result is affirmative, erasing the digital archive in the certain physical volume, whereas, if the archive storage deadline is expressed in period format, comparing the third duration and the period.

11. The method according to claim 9, comprising:
selecting a data erasure method from among data erasure methods of a plurality of types; and
erasing the digital archive in the physical volume according to the data erasure method thus selected.

12. The method according to claim 9,
wherein each of the plurality of storage control systems managing volume attribute information for each of two or more physical volumes that each of the plurality of storage control systems includes, and the volume management storage region storing volume attribute information for each of the plurality of physical volumes,
controlling at least one of a first storage control system that includes a first physical volume, and a second storage control system that includes a second physical volume to generate the digital archive in the first physical volume in the second physical volume; and
transmitting volume attribute information corresponding with the first physical volume to the second storage control system.

13. The method according to claim 9, comprising:
shifting the digital archive in the first physical volume to the second physical volume; and
when the digital archive is shifted from the first physical volume to the second physical volume, deleting the volume attribute information corresponding with the first physical volume from the volume management storage region or the first storage control system.

* * * * *